(12) United States Patent
Marchya et al.

(10) Patent No.: US 10,630,976 B2
(45) Date of Patent: Apr. 21, 2020

(54) DISPLAY REFRESH BLOCKS DETERMINATION FOR VIDEO CODING

(71) Applicant: QUALCOMM Incorporated, San Diego, CA (US)

(72) Inventors: Dileep Marchya, Hyderabad (IN); Dhaval Kanubhai Patel, San Diego, CA (US); Gopikrishnaiah Andandan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/104,488

(22) Filed: Aug. 17, 2018

(65) Prior Publication Data

US 2020/0059643 A1 Feb. 20, 2020

(51) Int. Cl.
| | |
|---|---|
| *H04N 19/159* | (2014.01) |
| *H04N 19/182* | (2014.01) |
| *H04N 19/172* | (2014.01) |
| *H04N 19/58* | (2014.01) |
| *H04N 19/105* | (2014.01) |
| *H04N 19/107* | (2014.01) |
| *H04N 19/50* | (2014.01) |
| *H04N 19/176* | (2014.01) |

(52) U.S. Cl.
CPC ......... *H04N 19/107* (2014.11); *H04N 19/172* (2014.11); *H04N 19/176* (2014.11); *H04N 19/182* (2014.11); *H04N 19/50* (2014.11)

(58) Field of Classification Search
CPC .. H04N 19/107; H04N 19/172; H04N 19/176; H04N 19/182; H04N 19/50
USPC .................................................. 375/240.12
See application file for complete search history.

(56) References Cited

U.S. PATENT DOCUMENTS

| | | | | |
|---|---|---|---|---|
| 8,755,445 | B2 * | 6/2014 | Hannuksela | H04N 21/23614 348/394.1 |
| 9,398,293 | B2 * | 7/2016 | Wang | H04N 19/70 |
| 9,883,137 | B2 | 1/2018 | Marchya et al. | |
| 2012/0288257 | A1 * | 11/2012 | Katsumata | G11B 27/309 386/248 |
| 2014/0071232 | A1 * | 3/2014 | Tsukagoshi | H04N 21/2353 348/43 |
| 2014/0369423 | A1 * | 12/2014 | Bruls | H04N 19/597 375/240.26 |
| 2016/0110368 | A1 * | 4/2016 | Mallasch | G06F 16/252 707/690 |
| 2017/0105023 | A1 | 4/2017 | Marchya et al. | |

(Continued)

*Primary Examiner* — Zaihan Jiang
(74) *Attorney, Agent, or Firm* — Holland & Hart LLP

(57) ABSTRACT

Methods, systems, and devices for processing display data are described. A device may receive a bitstream sequence including a quantity of intra-coded frames, inter-coded frames, or bi-directional frames, or a combination thereof. In some examples, the device may be a decoding device or an encoding device. Upon receiving the bitstream sequence, the device may determine a refresh pixel region for a frame based on an order of the quantity of intra-coded frames, inter-coded frames, or bi-directional frames, or a combination thereof. In some examples, the order may be an encoding order of the intra-coded frames, inter-coded frames, or bi-directional frames, or a combination thereof. The device may then send the refresh pixel region for the frame to a display device based on determining the refresh pixel region for the frame.

20 Claims, 10 Drawing Sheets

(56) References Cited

U.S. PATENT DOCUMENTS

| | | | |
|---|---|---|---|
| 2017/0310972 A1* | 10/2017 | Wang | H04N 19/105 |
| 2017/0346873 A1* | 11/2017 | Denoual | H04L 65/607 |
| 2018/0115776 A1* | 4/2018 | Holcomb | H04N 19/117 |
| 2018/0278964 A1* | 9/2018 | Wang | H04N 21/6332 |
| 2018/0376194 A1* | 12/2018 | Oh | H04N 21/42204 |
| 2019/0158935 A1* | 5/2019 | Denoual | H04N 19/167 |

* cited by examiner

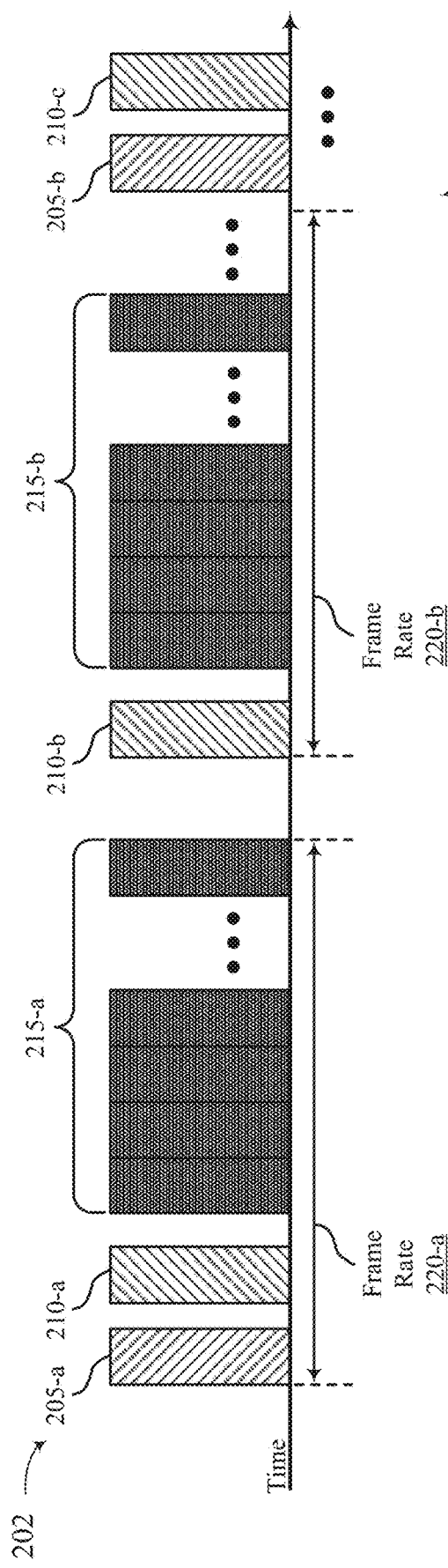
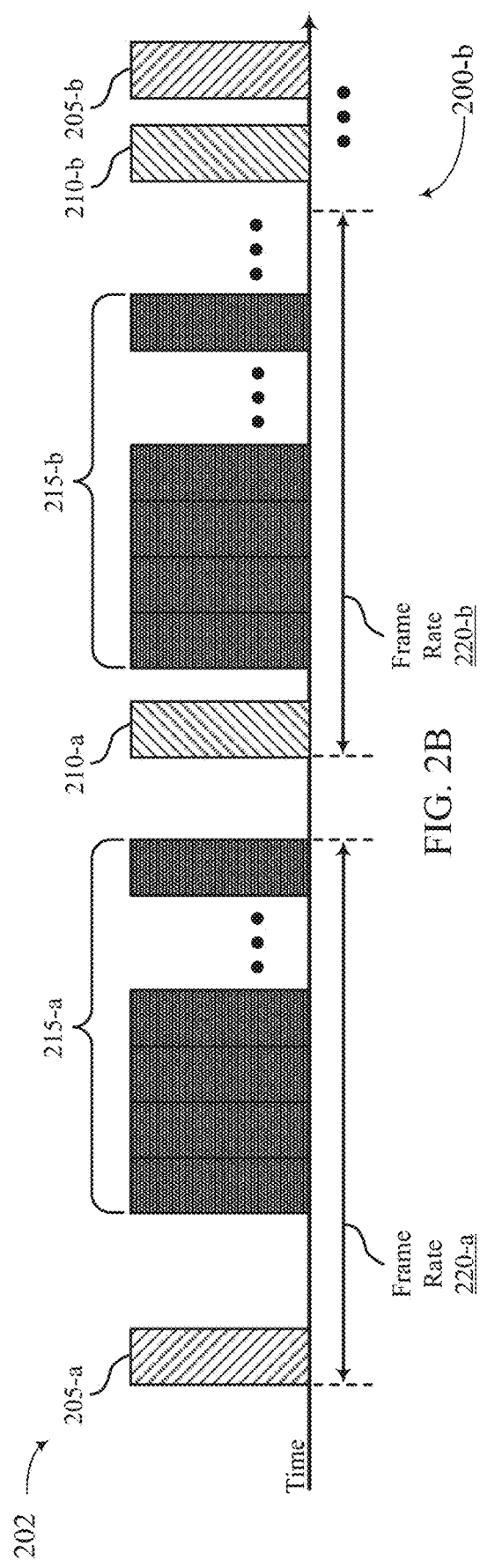

DISPLAY REFRESH BLOCKS DETERMINATION FOR VIDEO CODING

BACKGROUND

The following relates generally to processing display data, and more specifically to display refresh blocks determination for video coding.

User equipments (UEs) such as mobile devices are widely deployed to provide various types of communication and functional features such as applications that allow individuals to video stream, video conference, or video chat, and/or others. These exemplary applications may require the mobile device to unnecessarily refresh certain display data (e.g., pixels, frames). That is, a video conferencing application, for example, may have redundant video data due to little motion, static background, or high frame rate. As a result, updating all the video data may be an inefficient use of resources (e.g., central processing unit (CPU), graphical processing unit (GPU) resources) for the mobile device. Therefore, processing display refresh blocks while also reducing memory and power utilization related to the processing may be desirable.

SUMMARY

The described techniques relate to improved methods, systems, devices, and apparatuses that support display refresh blocks determination for video coding. A device such as a smartphone may receive a bitstream sequence that may include intra-coded frames, inter-coded frames, or bi-directional frames, or a combination thereof. The device may determine refresh pixel regions for a frame using the bitstream sequence, and send the refresh pixel regions for the frame to a display device to minimize frame buffer updates. After determining the refresh pixel region, the device may store the surface damage in a supplemental enhanced information (SEI) message. In another aspect, the device may receive and determine whether the bitstream sequence contains an SEI message. If the bitstream sequence contains an SEI message, the device may decode and retrieve the refresh pixel region information, and forward it to the display device (e.g., as metadata). In the case that the SEI message is absent from the bitstream sequence, the device may determine the refresh pixel region for a frame itself and forward it (e.g., as metadata) to the display device.

A method for processing display data is described. The method may include receiving a bitstream sequence comprising a quantity of intra-coded frames, inter-coded frames, or bi-directional frames, or a combination thereof, determining a refresh pixel region for a frame based at least in part on an order of the quantity of intra-coded frames, inter-coded frames, or bi-directional frames, or a combination thereof, and sending the refresh pixel region for the frame to a display device based at least in part on determining the refresh pixel region for the frame.

An apparatus that support processing display data is described. The apparatus may include means for receiving a bitstream sequence comprising a quantity of intra-coded frames, inter-coded frames, or bi-directional frames, or a combination thereof, means for determining a refresh pixel region for a frame based at least in part on an order of the quantity of intra-coded frames, inter-coded frames, or bi-directional frames, or a combination thereof, and means for sending the refresh pixel region for the frame to a display device based at least in part on determining the refresh pixel region for the frame.

Another apparatus that supports processing display data is described. The apparatus may include a processor, memory in electronic communication with the processor, and instructions stored in the memory. The instructions may be executable by the processor to cause the apparatus to receive a bitstream sequence comprising a quantity of intra-coded frames, inter-coded frames, or bi-directional frames, or a combination thereof, determine a refresh pixel region for a frame based at least in part on an order of the quantity of intra-coded frames, inter-coded frames, or bi-directional frames, or a combination thereof, and send the refresh pixel region for the frame to a display device based at least in part on determining the refresh pixel region for the frame.

A non-transitory computer-readable medium storing code that supports processing display data is described. The code may include instructions executable by a processor to receive a bitstream sequence comprising a quantity of intra-coded frames, inter-coded frames, or bi-directional frames, or a combination thereof, determine a refresh pixel region for a frame based at least in part on an order of the quantity of intra-coded frames, inter-coded frames, or bi-directional frames, or a combination thereof, and send the refresh pixel region for the frame to a display device based at least in part on determining the refresh pixel region for the frame.

Some examples of the method, apparatus, and non-transitory computer-readable medium described herein may further include operations, features, means, or instructions for storing refresh pixel region information for the frame in an SEI message based at least in part on determining the refresh pixel region for the frame.

Some examples of the method, apparatus, and non-transitory computer-readable medium described herein may further include operations, features, means, or instructions for determining that the bitstream sequence comprises an SEI message based at least in part on parsing the bitstream sequence for an indication in the bitstream sequence, decoding the SEI message based at least in part on determining the bitstream sequence comprises the SEI message, and identifying refresh pixel region information based at least in part on the decoding. In some examples of the method, apparatus, and non-transitory computer-readable medium described herein, determining the refresh pixel region for the frame is based at least in part on identifying the refresh pixel region information in the SEI message.

In some examples of the method, apparatus, and non-transitory computer-readable medium described herein, the refresh pixel region may include one or more pixel blocks indicating a change in content between the frame and a previous frame.

Some examples of the method, apparatus, and non-transitory computer-readable medium described herein may further include operations, features, means, or instructions for determining an absence of an SEI message in the bitstream sequence based at least in part on an indication in the bitstream sequence. In some examples of the method, apparatus, and non-transitory computer-readable medium described herein, determining the refresh pixel region for the frame is based at least in part on determining the absence of the SEI message in the bitstream sequence.

Some examples of the method, apparatus, and non-transitory computer-readable medium described herein may further include operations, features, means, or instructions for generating, in response to determining the absence of the SEI message in the bitstream sequence, metadata comprising refresh pixel region information, based at least in part on determining the refresh pixel region for the frame. In some examples of the method, apparatus, and non-transitory computer-readable medium described herein, sending the refresh pixel region for the frame comprises sending the metadata.

Some examples of the method, apparatus, and non-transitory computer-readable medium described herein may further include operations, features, means, or instructions for identifying a first set of pixel blocks for a bi-directional frame following an inter-coded frame, wherein the first set of pixel blocks are co-located with one or more non-inter-skip macro pixel blocks of a first reference frame, identifying a second set of pixel blocks for the bi-directional frame following the inter-coded frame, wherein the second set of pixel blocks are co-located with one or more non-inter-skip macro pixel blocks of a second reference frame, and determining a union of the first set of pixel blocks and the second set of pixel blocks. In some examples of the method, apparatus, and non-transitory computer-readable medium described herein, determining the refresh pixel region is based at least in part on the union of the first set of pixel blocks and the second set of pixel blocks.

Some examples of the method, apparatus, and non-transitory computer-readable medium described herein may further include operations, features, means, or instructions for identifying a first set of pixel blocks for a bi-directional frame following a prior bi-directional frame, wherein the first set of pixel blocks are co-located with one or more non-inter-skip macro pixel blocks of a first reference frame, identifying a second set of pixel blocks for the bi-directional frame following the prior bi-directional frame, wherein the second set of pixel blocks are co-located with one or more non-inter-skip macro pixel blocks of a second reference frame, and determining a union of the first set of pixel blocks and the second set of pixel blocks. In some examples of the method, apparatus, and non-transitory computer-readable medium described herein, determining the refresh pixel region is based at least in part on the union of the first set of pixel blocks and the second set of pixel blocks.

Some examples of the method, apparatus, and non-transitory computer-readable medium described herein may further include operations, features, means, or instructions for determining a union of a second refresh pixel region of the prior bi-directional frame and the refresh pixel region determined by the union of the first set of pixel blocks and the second set of pixel blocks. In some examples of the method, apparatus, and non-transitory computer-readable medium described herein, the refresh pixel region comprises the union of the refresh pixel region of the prior bi-directional frame and the refresh pixel region determined by the union of the first set of pixel blocks and the second set of pixel blocks.

Some examples of the method, apparatus, and non-transitory computer-readable medium described herein may further include operations, features, means, or instructions for determining that the refresh pixel region of the bi-directional frame satisfies a threshold size of the bi-directional frame, and assigning a refresh pixel region size to all subsequent bi-directional frames based at least in part on the refresh pixel region of the bi-directional frame satisfying the threshold size. In some examples of the method, apparatus, and non-transitory computer-readable medium described herein, the refresh pixel region size is a size of the subsequent bi-directional frames.

Some examples of the method, apparatus, and non-transitory computer-readable medium described herein may further include operations, features, means, or instructions for assigning for each intra-coded frame or inter-coded frame a refresh pixel region size equal to a frame size of each intra-coded frame or inter-coded frame.

Some examples of the method, apparatus, and non-transitory computer-readable medium described herein may further include operations, features, means, or instructions for identifying a set of pixel blocks for an inter-coded frame following an intra-coded frame, wherein the set of pixel blocks are co-located with one or more non-inter-skip macro pixel blocks of a reference frame. In some examples of the method, apparatus, and non-transitory computer-readable medium described herein, determining the refresh pixel region is based at least in part on the set of pixel blocks.

Some examples of the method, apparatus, and non-transitory computer-readable medium described herein may further include operations, features, means, or instructions for identifying a set of pixel blocks for an inter-coded frame following a prior inter-coded frame, wherein the set of pixel blocks are co-located with one or more non-inter-skip macro pixel blocks of a reference frame, and determining a union of a second refresh pixel region of the prior inter-coded frame and the set of pixel blocks, wherein the set of pixel blocks comprises a refresh pixel region for the inter-coded frame. In some examples of the method, apparatus, and non-transitory computer-readable medium described herein, determining the refresh pixel region is based at least in part on the union.

Some examples of the method, apparatus, and non-transitory computer-readable medium described herein may further include operations, features, means, or instructions for determining that the refresh pixel region of the inter-coded frame satisfies a threshold size of the inter-coded frame, and assigning a refresh pixel region size for all subsequent inter-coded frames based at least in part on the refresh pixel region of the inter-coded frame satisfying the threshold size. In some examples of the method, apparatus, and non-transitory computer-readable medium described herein, the refresh pixel region size is a size of the subsequent inter-coded frames.

BRIEF DESCRIPTION OF THE DRAWINGS

FIGS. 2A and 2B illustrate examples of bi-directional prediction sequences that support display refresh blocks determination for video coding in accordance with aspects of the present disclosure.

DETAILED DESCRIPTION

A device may receive a bitstream sequence that may include intra-coded frames, inter-coded frames, or bi-directional frames, or a combination thereof. The device may determine refresh pixel regions for a frame using the bitstream sequence, and send the refresh pixel regions for the frame to a display device. A refresh pixel region may be a portion of a frame where display content (e.g., pixel values) of the frame has changed from a previous frame. The device may determine that the display content of the frame has changed compared to a previous frame based at least in part on a determining a difference in pixel values between the two frames. For example, a device may identify a portion of a current picture that changed relative to an immediately previous picture so that only the regions of the current picture that changed are updated by a display processor for composition by the device. In one example, the device may perform an encoding operation including estimating a difference in pixel values (e.g., red-green-blue (RGB) values) or a difference in the luminance and chrominance values between a current frame and a previous frame to determine the refresh pixel regions. In some examples, the two frames may be consecutive or inconsecutive frames. The refresh pixel region related to the difference in pixel values may also be referred herein as "surface damage," "a refresh block", "a display refresh block," or "a dirty rectangle."

After determining the refresh pixel region, the device may store the refresh pixel region (e.g., in a supplemental enhanced information (SEI) message). In another aspect, the device may perform a decoding operation. When it comes to decoding, the device may determine whether the bitstream sequence contains an SEI message. If the bitstream sequence contains an SEI message, the device may decode and retrieve the refresh pixel region information, and forward it to the display device as metadata. Otherwise, if the SEI message is absent from the bitstream sequence, the device may determine the refresh pixel region for the frame itself and forward it as metadata to the display device.

Aspects of the disclosure are initially described in the context of a wireless communications system. Aspects of the disclosure are then described in the context of bi-directional prediction sequence, a forward direction prediction sequence, and a conceptual block diagram illustrating an example that supports display refresh blocks determination for video coding. Aspects of the disclosure are further illustrated by and described with reference to apparatus diagrams, system diagrams, and flowcharts that relate to display refresh blocks determination for video coding.

Figure 1:
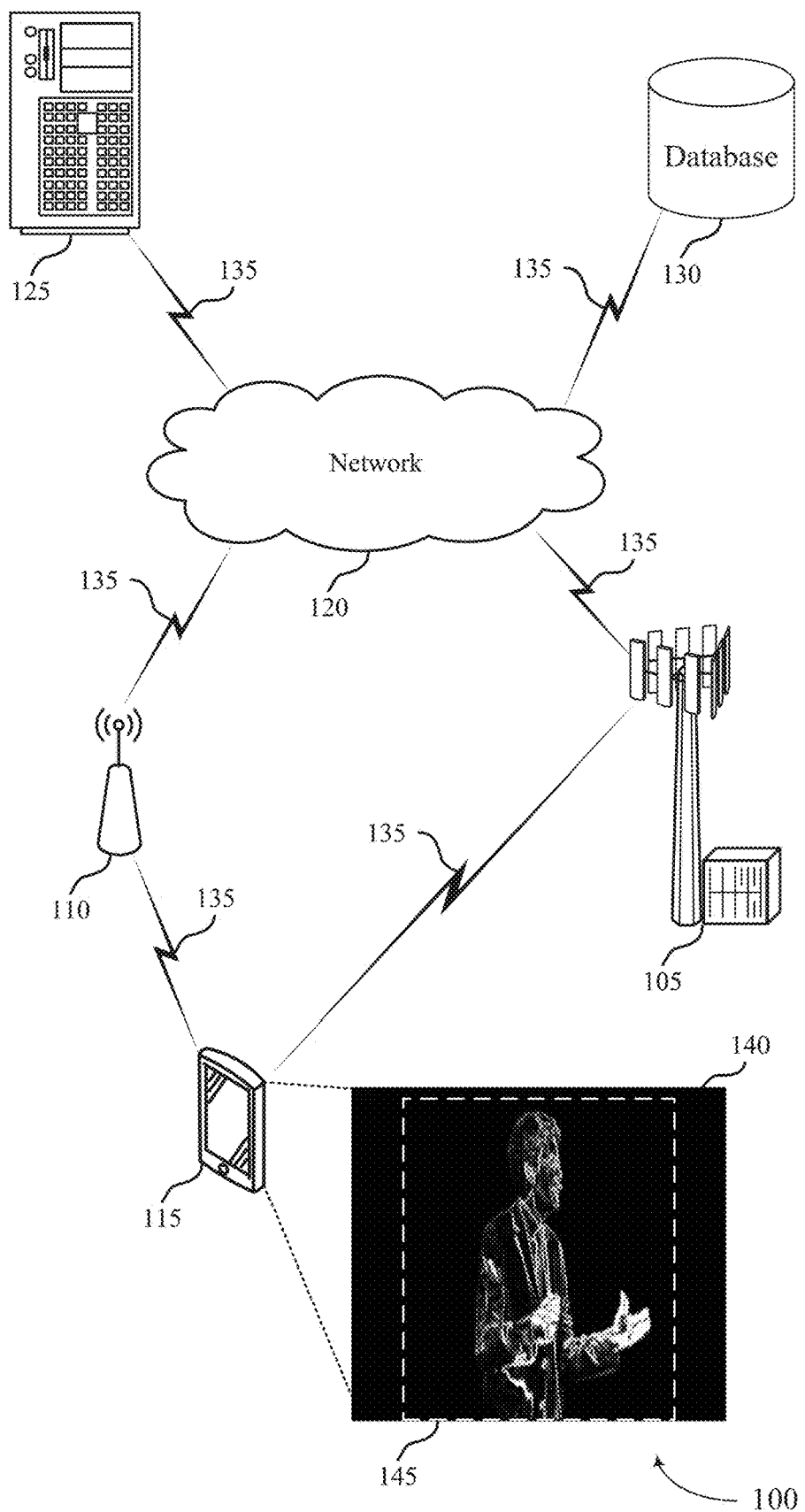
FIG. 1 illustrates an example of a system for processing display data that supports display refresh blocks determination for video coding in accordance with aspects of the present disclosure.

FIG. 1 illustrates an example of a system 100 for processing display data that supports display refresh blocks determination for video coding in accordance with aspects of the present disclosure. The system 100 may include a base station 105, an access point 110, a device 115, a server 125, and a database 130. The base station 105, the access point 110, the device 115, the server 125, and the database 130 may communicate with each other via network 120 using wireless communications links 135.

The base station 105 may wirelessly communicate with the device 115 via one or more base station antennas. Base station 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The device 115 described herein may be able to communicate with various types of base stations and network equipment including macro eNBs, small cell eNBs, gNBs, relay base stations, and the like. The access point 110 may be configured to provide wireless communications for the device 115 over a relatively smaller area compared to the base station 105.

In some examples, the device 115 may be stationary and/or mobile. In some examples, the device 115 may include a cellular phone, a smartphone, a digital camera, a standalone camera, a kiosk, a photo booth, a personal digital assistant (PDA), a wireless communication device, a handheld device, a tablet computer, a laptop computer, a cordless phone, a display device (e.g., monitors), and/or the like. The device 115 may, additionally or alternatively, include or be referred to by those skilled in the art as a user equipment (UE), a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the device 115 may also be able to communicate directly with another device (e.g., using a peer-to-peer (P2P) or device-to-device (D2D) protocol).

The device 115 may include memory, a processor, an output, and a communication module. The processor may be a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), and/or the like. The processor may be configured to process data (e.g., display data, pixel data, image data, video data) from and/or write data (e.g., display data, pixel data, image data, video data) to the memory. The processor may also be configured to provide multimedia enhancements, multimedia restoration, multimedia analysis, multimedia compression, and multimedia synthesis. For example, the device 115 may support processing display data to determine one or more display refresh blocks for multimedia coding, according to the techniques described herein.

The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, devices 115 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, processing and displaying data. The processor of device 115 may be operable to control operation of the output of the device 115. For example, the output may be an integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the device 115 to the output (e.g., display device).

The device 115 may be widely deployed to provide various types of applications executing on the processor of the device 115, as well as operation system level operations, that may provide data for display at the device 115 or via an output (e.g., display device). As an example, an application executing on the processor of the device 115 may generate data for a current date and time, another application executing on the processor of the device 115 may generate data for a background and/or edges of a display, another application executing on the processor of the device 115 may generate data for indicating an audio volume level, and so forth. Each of the generated data may be considered as a separate layer, and the memory of the device 115 may include a buffer that stores each of the layers. For example, the device 115 may parse a bitstream sequence to reconstruct frames that are displayed. The frames generated by the device 115 form a video layer in the buffer. The device 115 may instruct a display processor (e.g., provide instructions to a display processor (e.g., DPU)) to retrieve the video layer and other layers (e.g., a user interface layer constructed by a graphics processing unit (GPU)) from the buffer and compose the layers together to form the composed frame (i.e., a composite frame that combines the layers) that the device 115 displays.

In some cases, the processor of the device 115 may transfer pixel blocks that get updated between consecutive cycles. The processor of the device 115 may combine the updated pixel blocks and transfer a partial frame buffer to the output (e.g., display device), thereby avoiding redundant data transfers in case of partial pixel block updates. The device 115 may determine pixel blocks that may be combined from the refresh pixel regions received for each application layer. The device 115 may determine pixel blocks that may be combined from the refresh pixel regions received for each application layer. Each application layer may be rendered by various sources, for example, GPU, camera, video driver. Some techniques using graphics drivers may have the capability to generate refresh pixel regions, while video drivers and camera may be unable. As a result, the video and camera layers in the buffer are combined.

In another example, the processor of the device 115 may provide various types of communication and functional features such as video streaming, and/or others. In the video streaming example, the device 115 may in some cases unnecessarily refresh certain display data (e.g., pixels) autonomously because of redundant data due to nature of the scene (e.g., low motion, stationary background, and high frame rate video). As a result, a portion of a frame may change between successive frames, but the device 115 may refresh the full frame, which may lead to inefficient utilization of hardware resources and power usage of the device 115. According to the techniques described herein, the device 115 may determine refresh pixel region(s) without impacting the video encoding ecosystem.

The device 115 may determine or estimate a refresh pixel region 145 for a given frame 140 based at least in part on a display order at a time the frame 140 is processed by an encoder or decoder of the device 115. The refresh pixel region 145 may be a pixel area (e.g., n×m, where n and m are positive integers) of the frame 140 having elements (e.g., pixels) that changed compared to a previous frame. In some examples, the device 115 may receive a bitstream sequence including a sequence of frames. For example, the sequence of frames may include a quantity of intra-coded frames, inter-coded frames, or bi-directional frames, or a combination thereof. The bitstream sequence may be a bi-directional prediction sequence or a forward direction prediction sequence, or a combination thereof.

An intra-coded frame also referred to as an "I-frame" may be a frame coded using intra-prediction, which may include the process of deriving the prediction value (i.e., the value, which is the combination of the previously decoded sample values or data elements, used in the decoding process of the next sample value or data element) for the current sample using previously decoded sample values in the same decoded frame. An inter-coded frame also referred to as a "P-frame" may be a frame compressed by referencing previously decoded frames and which may use intra-prediction or inter-prediction using previous I or P frames as reference frames. Intra-prediction may include the process of deriving the prediction value for the current sample using previously decoded sample values in the same decoded frame. A bi-directional frame also referred to as a "B-frame" may be a frame that relates to other frames directly preceding or following it.

In an example, the device 115 may be an encoding device that may determine a refresh pixel region for one or more frames based at least in part on an order (e.g., an encoding order or display order) of the sequence of frames. For example, the device 115 may determine a refresh pixel region for a frame based at least in part on the intra-coded frames, inter-coded frames, or bi-directional frames, or a combination thereof in the bitstream sequence. The device 115 may store refresh pixel region information for the frame in a message (e.g., an SEI message). For example, the frame may be part of a video stream that may be encoded once but played several times by one or more devices. By determining the refresh pixel region for the frame or frames of the video stream (e.g., at an encoding device), this may eliminate redundant computations performed (e.g., by a decoding device) that may decode the video stream.

In another example, the device 115 may be a decoding device that may, before determining refresh pixel regions for one or more frames, determine whether the bitstream sequence contains a message (e.g., an SEI message). For example, the device 115 may determine whether the bitstream sequence contains an SEI message based at least in part on parsing the bitstream sequence for an indication in the bitstream sequence. For example, the device 115 may determine whether the bitstream sequence contains an SEI message based at least in part on an indication in the bitstream sequence (e.g., a single bit indication or multi-bit indication in a header portion of the bitstream sequence). If the bitstream sequence contains the SEI message, the device 115 may decode the SEI message and identify refresh pixel region information without having to determine the refresh pixel region independently. As a result, the decoding device may conserve processing resources. The decoding device may then generate metadata associated with the refresh pixel region information and forward it to a display device. In the case that SEI message is absent from the bitstream sequence, the device may determine the surface damage itself and forward it (e.g., as metadata, a syntax element of a message (e.g., SEI message)) to the display device for displaying updated frames.

The network 120 that may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. Network 120 may include the Internet.

The server 125 may include any combination of a data server, a cloud server, a server associated with an automation service provider, proxy server, mail server, web server, application server, database server, communications server, home server, mobile server, or any combination thereof. The server 125 may also transmit to the device 115 a variety of information, such as instructions or commands (e.g., display data, refresh pixel region information) relevant to refresh pixel region 145 determination for video coding. The database 130 may store data that may include instructions or commands (e.g., display data, refresh pixel region information) relevant to display refresh pixel region 145 determination for video coding for the device 115. The device 115 may retrieve the stored data from the database 130 via the base station 105 and/or the access point 110.

The wireless communications links 135 shown in the system 100 may include uplink transmissions from the device 115 to the base station 105, the access point 110, or the server 125, and/or downlink transmissions, from the base station 105, the access point 110, the server 125, and/or the database 130 to the device 115. The downlink transmissions may also be called forward link transmissions while the uplink transmissions may also be called reverse link transmissions. The wireless communications links 135 may transmit bidirectional communications and/or unidirectional communications. Wireless communications links 135 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to wireless communication systems.

FIGS. 2A and 2B illustrate examples of bi-directional prediction sequences that support display refresh blocks determination for video coding in accordance with aspects of the present disclosure. The bi-directional prediction sequence, illustrated in FIGS. 2A and 2B, may implement aspects of system 100. For example, the bi-directional prediction sequence 200-a associated with FIG. 2A may relate to an encoding order, while the bi-directional prediction sequence 200-b associated with FIG. 2B may relate to a display order. The device 115 alone or in combination with the base station 105, the access point 110, the server 125, or the database 130 may perform and/or be a means for handling, either alone or in combination with other elements, the bi-directional prediction sequence 200-a associated with FIG. 2A to support display refresh blocks determination for video coding.

With reference to the bi-directional prediction sequence 200-a, the device 115 may receive a bitstream sequence having a certain frame rate. For example, the device 115 may receive a bitstream sequence 202 having an intra-coded frame (I-frame) 205-a, an inter-coded frame (P-frame) 210-a, and a number of bi-directional frames (B-frames) 215-a. The bitstream sequence 202 may be associated with a frame rate 220-a, which may be the frequency at which frames 205-a, 210-a, and/or 215-a are displayed. The device 115 may also receive a following bitstream sequence having an inter-coded frame (P-frame) 210-b, a number of bi-directional frames (B-frames) 215-b, an intra-coded frame (I-frame) 205-b, and an inter-coded frame (P-frame) 210-c, and a frame rate 220-b.

The device 115 may determine one or more refresh pixel regions for a frame of the bitstream sequence 202 according to the following bi-directional prediction sequence scheme. The device 115 may for each bi-directional frame (B-frame) that is preceded by an inter-coded frame (P-frame) determine a refresh pixel region of at least some if not all co-located (e.g., in the same position), non-inter-skip macroblocks in a reference frame. For example, the device 115 may identify a first set of pixel blocks for a first bi-directional frame (B-frame) of the bi-directional frames 215-a, following the inter-coded frame (P-frame) 210-a. The first set of pixel blocks may be co-located (e.g., in the same position) with one or more non-inter-skip macro pixel blocks of a first reference frame. A macroblock may be a pixel area (e.g., n×m, where n and m are positive integers and may or may not be the same positive integer) of the frame. For example, a macroblock may be a 16×16 pixel area of a corresponding frame. The reference frame may be a previously decoded bi-directional frame (B-frame). For example, a previously decoded version of the first bi-directional frame (B-frame) of the bi-directional frames 215-a, or the inter-coded frame (P-frame) 210-a.

As part of the bi-directional prediction sequence scheme, the device 115 may determine a refresh pixel region of all co-located, non-inter-skip macroblocks in a reference frame that are also co-located, non-inter-skip macroblocks in the near reference frame's reference frame. For example, the device 115 may identify a second set of pixel blocks for the first bi-directional frame of the bi-directional frames 215-a following the inter-coded frame 210-a. The second set of pixel blocks may be co-located with one or more non-inter-skip macro pixel blocks of a second reference frame. That is, the device 115 may identify a set of pixel blocks for a reference frame of the previously decoded version of the first bi-directional frame (B-frame) of the bi-directional frames 215-a or the inter-coded frame (P-frame) 210-a. In this case, the second reference frame may be the previously decoded version of the inter-coded frame (P-frame) 210-a or intra-coded frame (I-frame) 205-a.

After the device 115 has identified the first set of pixel blocks and the second set of pixel blocks, the device 115 may determine a union of the first set of pixel blocks and the second set of pixel blocks. The union may include all pixels (e.g., pixel values, pixel data) of the first set of pixel blocks and the second set of pixel blocks and/or overlapping pixels of the first set of pixel blocks and the second set of pixel block. As a result, the union may be the refresh pixel region for the first bi-directional frame (B-frame) of the bi-directional frames 215-a.

Additionally, as part of the bi-directional prediction sequence scheme, the device 115 may for each bi-directional frame (B-frame) that is preceded by another bi-directional frame (B-frame) determine a refresh pixel region of all co-located, non-inter-skip macroblocks in a far reference frame. For example, the device 115 may identify a first set of pixel blocks for a second bi-directional frame (B-frame) of the bi-directional frames 215-a following a prior bi-directional frame (B-frame). The first set of pixel blocks may be co-located with one or more non-inter-skip macro pixel blocks of a first reference frame. The reference frame may be the prior bi-directional frame (B-frame). The device 115 may then determine a refresh pixel region of all co-located, non-inter-skip macroblocks in the near reference frame that are also co-located, non-inter-skip in near reference frame's reference frame. For example, the device 115 may identify a second set of pixel blocks for the second bi-directional frame (B-frame) of the bi-directional frames 215-a following the prior bi-directional frame (B-frame) of the bi-directional frames 215-a.

The second set of pixel blocks may be co-located with one or more non-inter-skip macro pixel blocks of a second reference frame. That is, the device 115 may identify a set of pixel blocks for a reference frame of the previously decoded version of the second bi-directional frame (B-frame) of the bi-directional frames 215-*a* or the inter-coded frame (P-frame) 210-*a*. In this case, the second reference frame may be previously decoded version of the inter-coded frame (P-frame) 210-*a* or the prior bi-directional frame (B-frame) to the second bi-directional frame (B-frame).

After the device 115 has identified the first set of pixel blocks and the second set of pixel blocks, the device 115 may determine a union of the first set of pixel blocks and the second set of pixel blocks. The union may include all pixels of the first set of pixel blocks and the second set of pixel blocks and/or overlapping pixels of the first set of pixel blocks and the second set of pixel block. The device 115 may then determine a union of the refresh pixel region with a preceding bi-directional frame's (B-frame's) refresh pixel region.

That is, the device 115 may determine a union of a second refresh pixel region of the prior bi-directional frame (B-frame) and the refresh pixel region determined by the union of the first set of pixel blocks and the second set of pixel blocks. As a result, the union may be the refresh pixel region for the second bi-directional frame (B-frame) of the bi-directional frames 215-*a*. As such, the refresh pixel region may include the union of the refresh pixel region of the prior bi-directional frame (B-frame) and the refresh pixel region determined by the union of the first set of pixel blocks and the second set of pixel blocks.

In some cases, if the refresh pixel region of any bi-directional frame (B-frame) is a full frame size, the device 115 may assign the refresh pixel region of all subsequent bi-directional frames (B-frames) to the full frame size until a bi-directional frame (B-frame) with an inter-coded frame (P-frame) as predecessor is encoded (e.g., P-frame 210-*b*). For example, the device 115 may determine that the refresh pixel region of the second bi-directional frame (B-frame) satisfies a threshold size of the bi-directional frame, and assign a refresh pixel region size to all subsequent bi-directional frames (B-frames) based at least in part on the refresh pixel region of the bi-directional frame (B-frame) satisfying the threshold size. The device 115 may additionally, or alternatively, assign for each intra-coded frame (I-frame) or inter-coded frame (P-frame) a refresh pixel region size less than or equal to a frame size of each intra-coded (I-frame) frame or inter-coded frame (P-frame).

In some cases, the device 115 may store the determined refresh pixel region as refresh pixel region information for the frame (e.g., in an SEI message). As such, when the device 115 transmit the bitstream sequence 202 to a display device, the display device may process refresh pixel regions efficiently by skipping the operations related to determining the refresh pixel regions and directly decoding the frames using at least in part the refresh pixel region information provided in the SEI message. In some examples, the refresh pixel region information may be provided in the SEI message as metadata. Alternatively, the display device may perform the operations related to determining the refresh pixel regions in response to the SEI message being absent from the bitstream sequence 202.

With reference to the display order of the bi-directional prediction sequence 200-*b*, the device 115 or a display device may receive and display the bi-directional prediction sequence 200-*b*. For example, the device 115 or a display device may receive and display the bitstream sequence 202 having an intra-coded frame (I-frame) 205-*a* and a number of bi-directional frames (B-frames) 215-*a*. The bitstream sequence 202 may be associated with a frame rate 220-*a*, which may be the frequency at which frames 205-*a* and/or 215-*a* are displayed. The device 115 or the display device may also receive a following bitstream sequence having an inter-coded frame (P-frame) 210-*a*, a number of bi-directional frames (B-frames) 215-*b*, an inter-coded frame (P-frame) 210-*b*, and an intra-coded frame (I-frame) 205-*b*. The following bitstream sequence may also have a frame rate 220-*b*. The display order of the bi-directional prediction sequence 200-*b* may be based at least in part on the encoding order of the bi-directional prediction sequence 200-*a*. Therefore, the bi-directional prediction sequence scheme may provide a display device (e.g., the device 115) to process refresh pixel regions efficiently while also reducing memory and power utilization related to the processing.

Figure 3A:
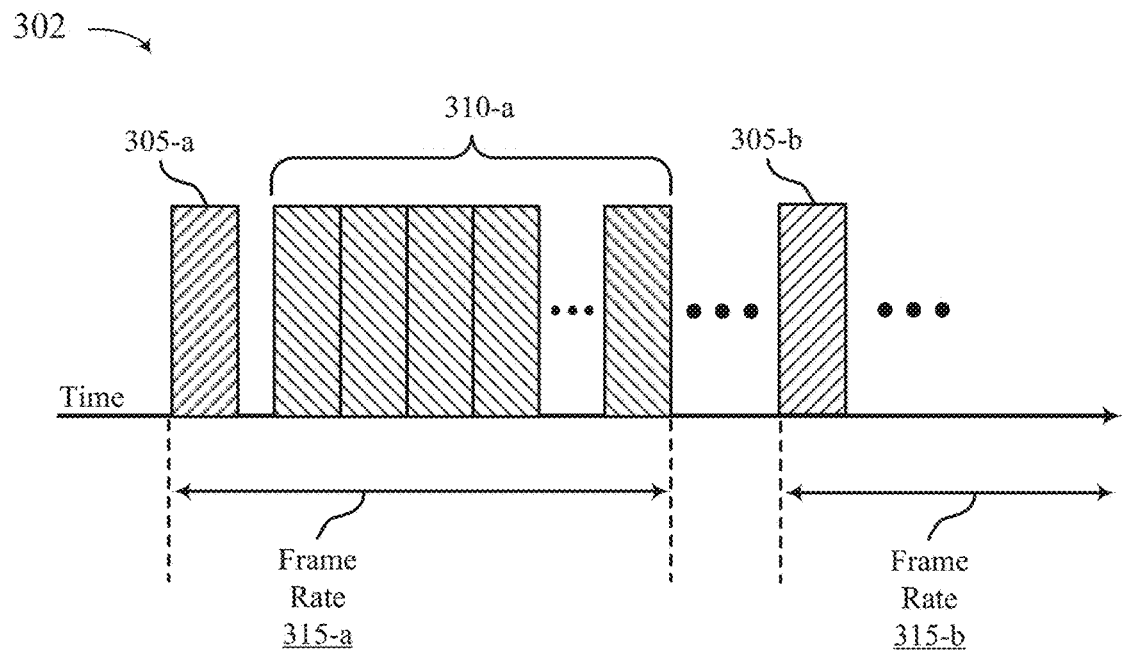
FIGS. 3A and 3B illustrate examples of forward direction prediction sequences that support display refresh blocks determination for video coding in accordance with aspects of the present disclosure.
Figure 3B:
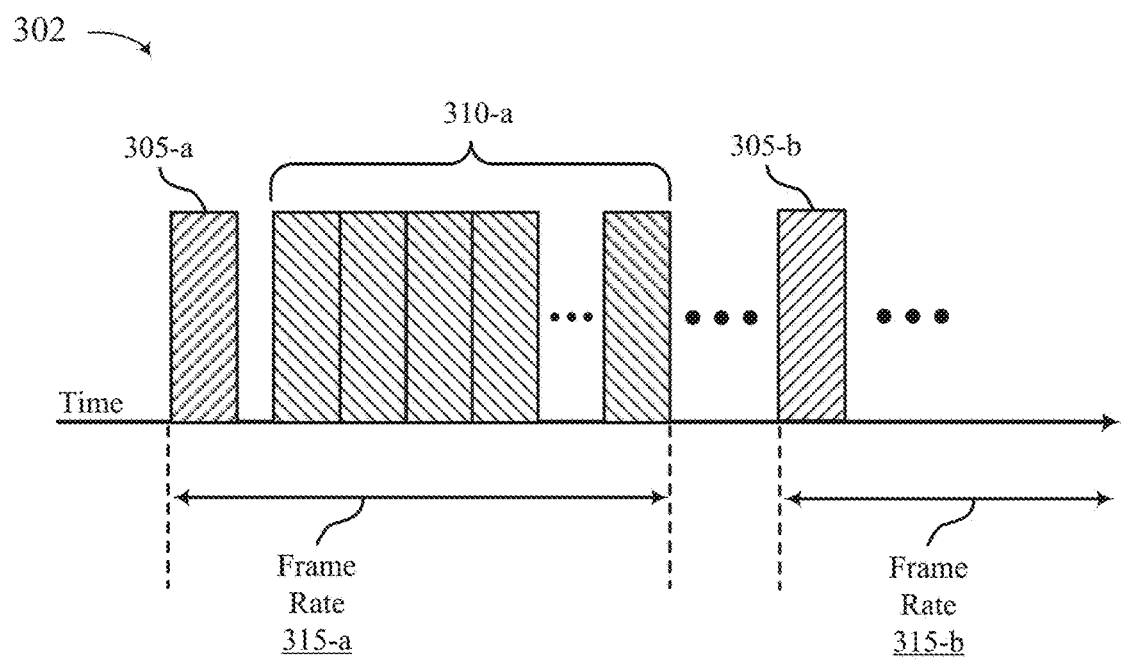

FIGS. 3A and 3B illustrate examples of forward direction prediction sequences that support display refresh blocks determination for video coding in accordance with aspects of the present disclosure. The forward direction prediction sequence, illustrated in FIGS. 3A and 3B, may implement aspects of system 100. For example, the forward direction prediction sequence 300-*a* associated with FIG. 3A may relate to an encoding order, while the forward direction prediction sequence 300-*b* associated with FIG. 3B may relate to a display order. The device 115, alone or in combination, with the base station 105, the access point 110, the server 125, or the database 130 may perform and/or be a means for handling, either alone or in combination with other elements, the forward direction prediction sequence 300-*a* to support display refresh blocks determination for video coding.

With reference to the forward direction prediction sequence 300-*a*, the device 115 may receive a bitstream sequence having a certain frame rate. For example, the device 115 may receive a bitstream sequence 302 having an intra-coded frame (I-frame) 305-*a* and a number of inter-coded frames (P-frames) 310-*a*. The bitstream sequence 302 may be associated with a frame rate 315-*a*, which may be the frequency at which frames 305 and/or 310 are displayed. The device 115 may also receive a following bitstream sequence having an inter-coded frame (P-frame) 305-*b*, etc. The following bitstream sequence may also have a frame rate 315-*b* that may be same or different to the frame rate 315-*a*.

The device 115 may determine one or more refresh pixel regions for a frame of the bitstream sequence 302 according to the following forward direction prediction sequence scheme. For each inter-coded frames (P-frame) that is preceded by an intra-coded frame (I-frame), the device 115 may determine a refresh pixel region of at least some if not all co-located, non-inter-skip macroblocks in a near reference frame. For example, the device 115 may identify a set of pixel blocks for a first inter-coded frame (P-frame) of the plurality of inter-coded frames (P-frames) 310-*a* following the intra-coded frame (I-frame) 305-*a*. In this example, the near reference frame may be the intra-coded frame (I-frame) 305-*a* or a previously decoded version of the first inter-coded frame (P-frame).

Additionally, as part of the forward direction prediction sequence scheme, the device 115 may for each inter-coded frames (P-frame) that is preceded by another inter-coded frame (P-frame) determine a refresh pixel region of all co-located, non-inter-skip macroblocks in the far reference frame. For example, the device 115 may identify a set of pixel blocks for a second inter-coded frame (P-frame) following a prior inter-coded frame (e.g., the first inter-coded frame (P-frame) of the plurality of inter-coded frames (P-frames) 310-*a*). The device 115 may then determine a union of the above refresh pixel region with the preceding P-frame's refresh pixel region (i.e., the first inter-coded frame (P-frame)), and set the resultant refresh pixel region as the union of the above refresh pixel region with the preceding P-frame's refresh pixel region. The device 115 may repeat the forward direction prediction scheme for the following inter-coded frame (P-frame) of the plurality of inter-coded frames (P-frames) 310-a of the bitstream sequence 302.

In some cases, if the refresh pixel region of any inter-coded frame (P-frame) is a full frame size, the device 115 may set the refresh pixel region all subsequent inter-coded frames (P-frames) to a certain frame size (e.g., the full frame size), until an inter-coded frames (P-frame) with an intra-coded frame (I-frame) predecessor is encoded. For example, the device 115 may determine that the refresh pixel region of the first inter-coded frame (P-frame) satisfies a threshold size of the inter-coded frame (P-frame) and assign a refresh pixel region size for at least some if not all subsequent inter-coded frames (P-frames) based at least in part on the refresh pixel region of the first inter-coded frame satisfying the threshold size.

In some cases, the device 115 may store the determined refresh pixel region as refresh pixel region information for the frame (e.g., in an SEI message). As such, when the device 115 transmit the bitstream sequence 302 to a display device, the display device may process refresh pixel regions efficiently by skipping the operations related to determining the refresh pixel regions and directly decoding the frames using at least in part the refresh pixel region information provided in the SEI message. In some examples, the refresh pixel region information may be provided in the SEI message as metadata. Alternatively, the display device may perform the operations related to determining the refresh pixel regions in the event that the SEI message is absent from the bitstream sequence 302.

With reference to the display order of the forward direction prediction sequence 300-b, the device 115 or a display device may receive and display the forward direction prediction sequence 300-b. For example, the device 115 or a display device may receive and display the bitstream sequence 302 having an intra-coded frame (I-frame) 305-a and a number of inter-coded frames (I-frames) 310-a. The bitstream sequence 302 may be associated with a frame rate 315-a, which may be the frequency at which frames 305 and 310 are displayed. The device 115 or the display device may also receive a following bitstream sequence having an intra-coded frame (I-frame) 305-b, etc. having a frame rate 315-b. The display order of the forward direction prediction sequence 300-b may be based at least in part on the encoding order of the forward direction prediction sequence 300-a. Therefore, the bi-directional prediction sequence scheme provides a display device (e.g., the device 115) to process refresh pixel regions efficiently while also reducing memory and power utilization related to the processing.

Figure 4B:
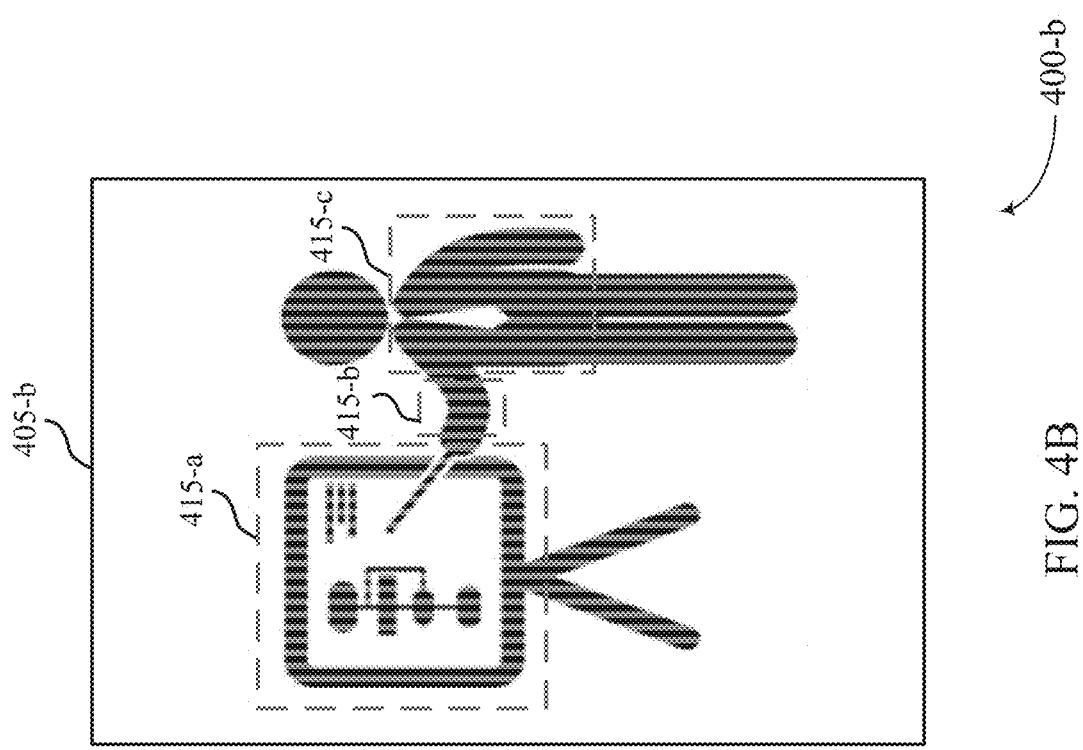
FIGS. 4A and 4B illustrate conceptual block diagrams depicting an example that supports display refresh blocks determination for video coding in accordance with aspects of the present disclosure.
Figure 4A:
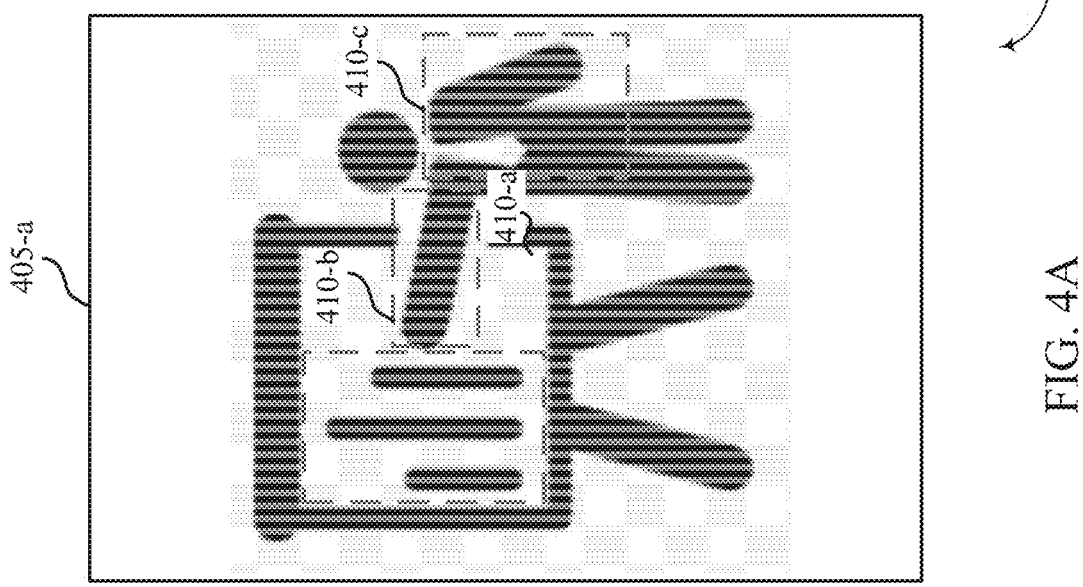

FIGS. 4A and 4B illustrate conceptual block diagrams depicting an example that supports display refresh blocks determination for video coding in accordance with aspects of the present disclosure. The conceptual block diagram 400-a associated with FIG. 4A and conceptual block diagram 400-b associated with FIG. 4B may be examples of aspects described with reference to FIGS. 1 through 3B. The conceptual block diagram 400-a may depict a frame 405-a, while the conceptual block diagram 400-b may depict a second frame 405-b.

As used herein, the term "frame" may encompass any unit of any suitable computer vision technique. For example, the frame 405-a and the frame 405-b may be synthetic composite models of an image or video of a video stream. In some examples, the frame 405-a and/or frame 405-b may be an intra-coded frame (I-frame), an inter-coded frame (P-frame), or a bi-directional coded frame (B-frame).

With reference to FIGS. 2A, 2B, 3A and 3B, the device 115 may determine refresh pixel regions 410-a through 410-c for frame 405-a and determine refresh pixel regions 415-a through 415-c for frame 405-b according to the bi-directional prediction sequence and/or the forward direction prediction sequence scheme described herein. In some examples, the device 115 may store refresh pixel region information associated with at least some of the refresh pixel regions 410-a through 410-c for the frame 405-a and determine refresh pixel regions 415-a through 415-c for the frame 405-b (e.g., in an SEI message). For example, the device 115 may store the refresh pixel regions 410-a through 410-c for frame 405-a and determine refresh pixel regions 415-a through 415-c for frame 405-b as metadata in an SEI message.

Figure 5:
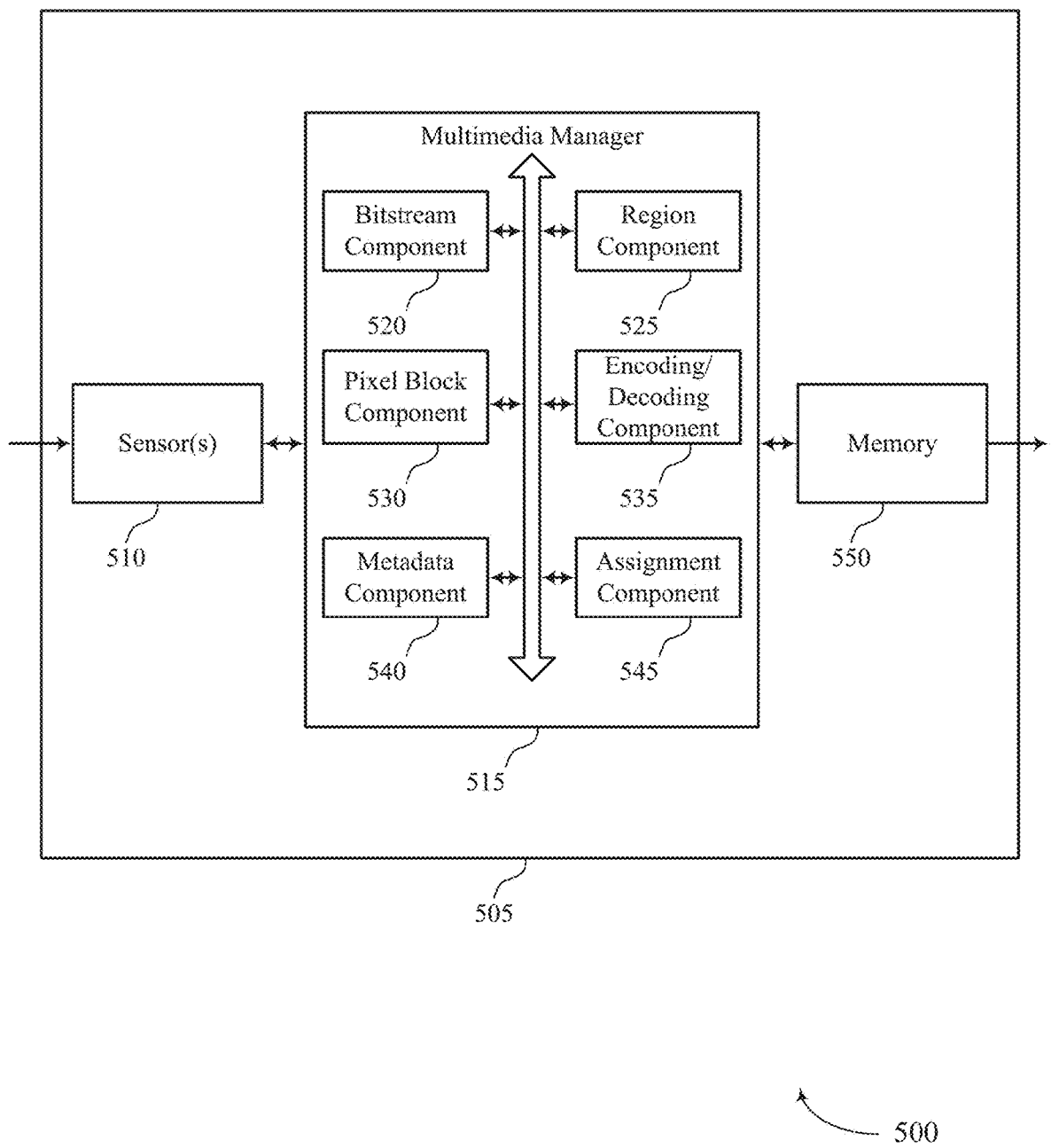
FIG. 5 shows a block diagram of a device that supports display refresh blocks determination for video coding in accordance with aspects of the present disclosure.

FIG. 5 shows a block diagram 500 of a device 505 that supports display refresh blocks determination for video coding in accordance with aspects of the present disclosure. The device 505 may be an example of aspects of a device as described herein. The device 505 may include sensor(s) 510, a multimedia manager 515, and memory 550. The device 505 may also include a processor. Each of these components may be in communication with one another (e.g., via one or more buses).

Sensor(s) 510 may receive information such as frames, packets, user data, or control information associated with various information channels (e.g., control channels, data channels, and information related to intra-coded frames, inter-coded frames, or bi-directional frames, or a combination thereof, etc.). Information may be passed on to other components of the device. Sensor(s) 510 may be an example of an image sensor for capturing images. For example, sensor(s) 510 may represent a camera operable to capture an image of a scene that may be processed by multimedia manager 515 alone according to aspects of the present disclosure. In another example, sensor(s) 510 may be an optical depth sensor (e.g., for determining or estimating a depth of an object or scene with respect to device 505), a lux sensor (e.g., for detecting an illumination condition, luminance levels), a motion sensor (e.g., for detecting motion associated with the scene), an infrared heat sensor (e.g., for detecting humans and animals vs. objects in the scene), among others. Sensor(s) 510 may, in some cases, be a charge coupled device (CCD) sensor or a complementary metal-oxide semiconductor (CMOS) sensor.

Multimedia manager 515 and/or at least some of its various sub-components may be implemented in hardware, software executed by a processor, firmware, or any combination thereof. If implemented in software executed by a processor, the functions of the Multimedia manager 515 and/or at least some of its various sub-components may be executed by a general-purpose processor, an intelligent hardware device, (e.g., a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof) or other programmable logic device, discrete gate or transistor logic, discrete hardware components, or any combination thereof designed to perform the functions described in the present disclosure.

The multimedia manager 515 and/or at least some of its various sub-components may be a separate and distinct component in accordance with various aspects of the present disclosure. In other examples, the multimedia manager 515 and/or at least some of its various sub-components may be combined with one or more other hardware components, including but not limited to an I/O component, another computing device, one or more other components described in the present disclosure, or a combination thereof in accordance with various aspects of the present disclosure. The multimedia manager 515 may also include a bitstream component 520, a region component 525, a pixel block component 530, an encoding/decoding component 535, a metadata component 540, and an assignment component 545.

The bitstream component 520 may receive a bitstream sequence comprising a quantity of intra-coded frames, inter-coded frames, or bi-directional frames, or a combination thereof. The bitstream component 520 may determine that the bitstream sequence includes a supplemental enhanced information (SEI) message based at least in part on parsing the bitstream sequence for an indication in the bitstream sequence. The bitstream component 520 may determine an absence of a supplemental enhanced information (SEI) message in the bitstream sequence based at least in part on an indication in the bitstream sequence.

The region component 525 may determine a refresh pixel region for a frame based at least in part on an order of the quantity of intra-coded frames, inter-coded frames, or bi-directional frames, or a combination thereof. The region component 525 may send the refresh pixel region for the frame to a display device based at least in part on determining the refresh pixel region for the frame. The region component 525 may store the refresh pixel region information for the frame in a supplemental enhanced information (SEI) message based at least in part on determining the refresh pixel region for the frame. In some examples, determining the refresh pixel region for the frame is based at least in part on determining the absence of the SEI message in the bitstream sequence. The region component 525 may identify refresh pixel region information based at least in part on the decoding. In some examples, determining the refresh pixel region for the frame is based at least in part on identifying the refresh pixel region information in the SEI message. In some examples, the refresh pixel region may include one or more pixel blocks indicating a change in content between the frame and a previous frame.

The pixel block component 530 may identify a first set of pixel blocks for a bi-directional frame following an inter-coded frame, wherein the first set of pixel blocks are co-located with one or more non-inter-skip macro pixel blocks of a first reference frame. The pixel block component 530 may identify a second set of pixel blocks for the bi-directional frame following the inter-coded frame, wherein the second set of pixel blocks are co-located with one or more non-inter-skip macro pixel blocks of a second reference frame. The pixel block component 530 may determine a union of the first set of pixel blocks and the second set of pixel blocks. In some examples, determining the refresh pixel region is based at least in part on the union of the first set of pixel blocks and the second set of pixel blocks.

The pixel block component 530 may identify a first set of pixel blocks for a bi-directional frame following a prior bi-directional frame, wherein the first set of pixel blocks are co-located with one or more non-inter-skip macro pixel blocks of a first reference frame. The pixel block component 530 may identify a second set of pixel blocks for the bi-directional frame following the prior bi-directional frame, wherein the second set of pixel blocks are co-located with one or more non-inter-skip macro pixel blocks of a second reference frame. The pixel block component 530 may determine a union of the first set of pixel blocks and the second set of pixel blocks. In some examples, determining the refresh pixel region is based at least in part on the union of the first set of pixel blocks and the second set of pixel blocks.

The pixel block component 530 may determine a union of a second refresh pixel region of the prior bi-directional frame and the refresh pixel region determined by the union of the first set of pixel blocks and the second set of pixel blocks. In some examples, the refresh pixel region includes the union of the refresh pixel region of the prior bi-directional frame and the refresh pixel region determined by the union of the first set of pixel blocks and the second set of pixel blocks.

The pixel block component 530 may determine that the refresh pixel region of the bi-directional frame satisfies a threshold size of the bi-directional frame. The pixel block component 530 may identify a set of pixel blocks for an inter-coded frame following an intra-coded frame. In some examples, the set of pixel blocks are co-located with one or more non-inter-skip macro pixel blocks of a reference frame. In some examples, determining the refresh pixel region is based at least in part on the set of pixel blocks.

The pixel block component 530 may identify a set of pixel blocks for an inter-coded frame following a prior inter-coded frame. In some examples, the set of pixel blocks are co-located with one or more non-inter-skip macro pixel blocks of a reference frame. The pixel block component 530 may determine a union of a second refresh pixel region of the prior inter-coded frame and the set of pixel blocks. In some examples, the set of pixel blocks comprises a refresh pixel region for the inter-coded frame. In some examples, determining the refresh pixel region is based at least in part on the union. The pixel block component 530 may determine that the refresh pixel region of the inter-coded frame satisfies a threshold size of the inter-coded frame.

The encoding/decoding component 535 may decode the SEI message based at least in part on determining the bitstream sequence comprises the SEI message. The metadata component 540 may generate, in response to determining the absence of the SEI message in the bitstream sequence, metadata including refresh pixel region information, based at least in part on determining the refresh pixel region for the frame. In some examples, sending the refresh pixel region for the frame comprises sending the metadata.

The assignment component 545 may assign a refresh pixel region size to all subsequent bi-directional frames based at least in part on the refresh pixel region of the bi-directional frame satisfying the threshold size. In some examples, the refresh pixel region size is a size of the subsequent bi-directional frames. The assignment component 545 may assign for each intra-coded frame or inter-coded frame a refresh pixel region size equal to a frame size of each intra-coded frame or inter-coded frame. The assignment component 545 may assign a refresh pixel region size for all subsequent inter-coded frames based at least in part on the refresh pixel region of the inter-coded frame satisfying the threshold size. In some examples, the refresh pixel region size is a size of the subsequent inter-coded frames.

Memory 550 may include random access memory (RAM) and read only memory (ROM). The memory 550 may, additionally or alternatively, include static RAM (SRAM), dynamic RAM (DRAM), electrically erasable programmable read-only memory (EEPROM), compact disk-ROM (CD-ROM) or other optical disc storage, magnetic disc storage, or other magnetic storage devices, flash memory, or any other medium that can be used to store desired program code in the form of instructions or data structures and that can be accessed by a computer or a processor. The memory 550 may store computer-readable, computer-executable software including instructions that, when executed, cause the processor to perform various functions described herein. Memory 550 may store image data, pixel array, configuration information (e.g., refresh pixel region information), among other information. In some cases, the memory 550 may contain, among other things, a basic input/output system (BIOS) which may control basic hardware or software operation such as the interaction with peripheral components or devices.

As detailed above, multimedia manager 515 and/or one or more components of the multimedia manager 515 may perform and/or be a means for performing, either alone or in combination with other elements, one or more operations for display refresh blocks determination for bi-directional video coding.

Figure 6:
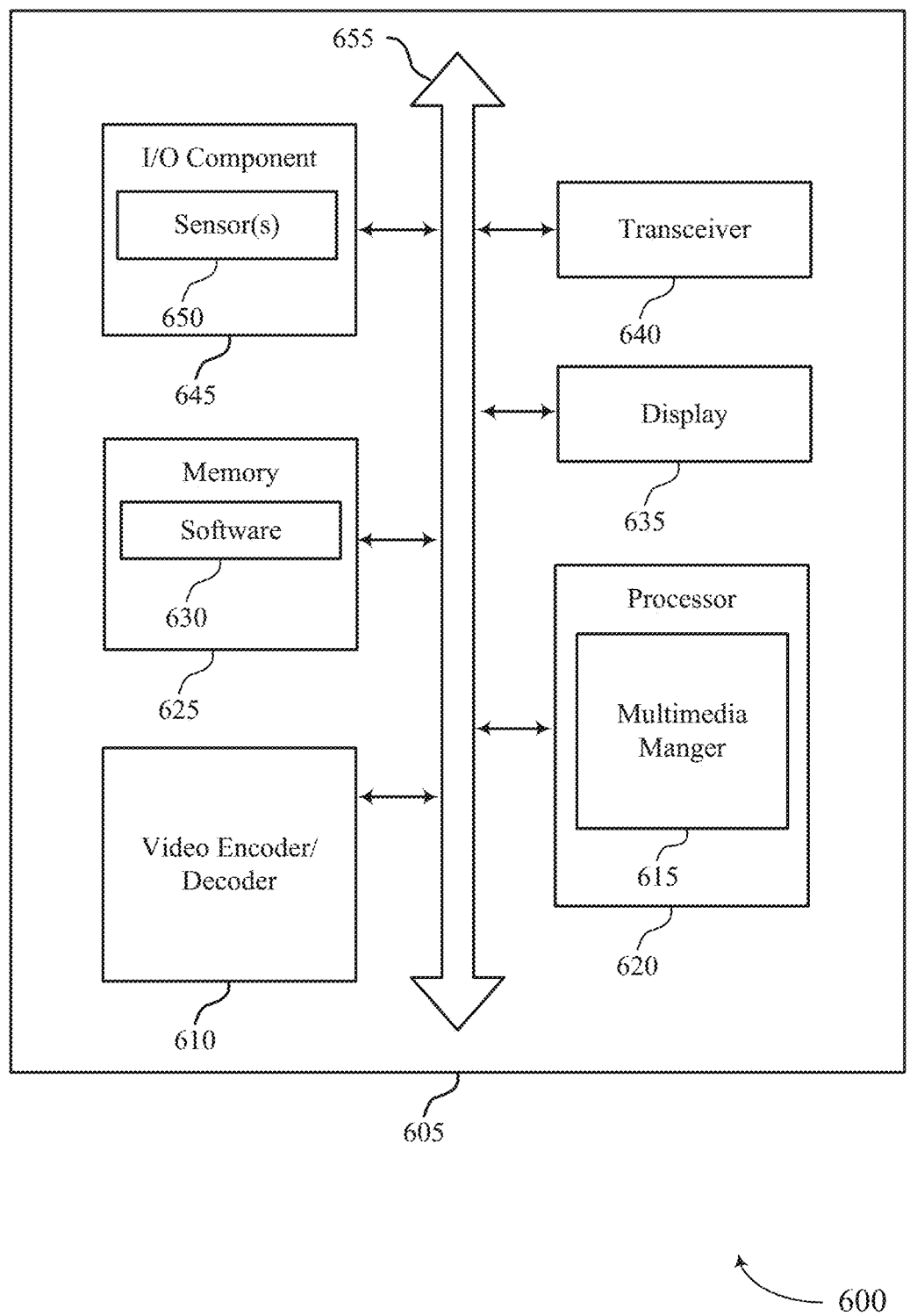
FIG. 6 shows a block diagram including a device that supports display refresh blocks determination for video coding in accordance with aspects of the present disclosure.

FIG. 6 shows a diagram of a block diagram 600 including a device 605 that supports display refresh blocks determination for video coding in accordance with aspects of the present disclosure. The device 605 may include components for bi-directional data communications including components for transmitting and receiving communications, including a video encoder/decoder 610, multimedia manager 615, processor 620, memory 625, software 630, display 635, transceiver 640, I/O component 645, and sensor(s) 650. These components may be in electronic communication via one or more buses (e.g., bus 655). The multimedia manager 615 may, alone or in combination, with video encoder/decoder 610, processor 620, memory 625, software 630, display 635, transceiver 640, I/O component 645, and sensor(s) 650 perform display refresh blocks determination for bi-directional video coding.

The video encoder/decoder 610 may mange encoding and decoding of a frame including a quantity of intra-coded frames, inter-coded frames, or bi-directional frames, or a combination thereof. The video encoder/decoder 610 may encode and/or decode a digital image or video to meet proper formats and specifications for recording and playback. For example, video encoder/decoder 610 may convert information from one format or code to another, for the purposes of standardization, speed or compression.

The multimedia manager 615 may receive a bitstream sequence comprising a quantity of intra-coded frames, inter-coded frames, or bi-directional frames, or a combination thereof, determine a refresh pixel region for a frame based at least in part on an order of the quantity of intra-coded frames, inter-coded frames, or bi-directional frames, or a combination thereof, and send the refresh pixel region for the frame to a display device based at least in part on determining the refresh pixel region for the frame.

The processor 620 may include an intelligent hardware device, (e.g., a general-purpose processor, a DSP, a CPU, a GPU, a microcontroller, an ASIC, an FPGA, a programmable logic device, a discrete gate or transistor logic component, a discrete hardware component, or any combination thereof). Processor 620 may be configured to execute computer-readable instructions stored in a memory to perform various functions (e.g., functions or tasks supporting display refresh blocks determination for video coding). The processor 620 may also be configured as a display processor to retrieve image content from memory 625, compose the image content into an image frame, and output the image frame to display 635. Processor 620 may include one or more ISPs configured for image processing. In some examples, processor 620 may perform image enhancements, image restoration, image analysis, image compression, and image synthesis. For example, processor 620 may perform white balancing, cropping, scaling (e.g., image compression), adjusting a resolution, image stitching, image format conversion, color processing, image filtering, spatial image filtering, artifact removal, among others.

Memory 625 may include RAM and ROM. The memory 625 may, additionally or alternatively, include SRAM, DRAM, EEPROM, CD-ROM or other optical disc storage, magnetic disc storage, or other magnetic storage devices, flash memory, or any other medium that can be used to store desired program code in the form of instructions or data structures and that can be accessed by a computer or processor 620. The memory 625 may store computer-readable, computer-executable software 630 including instructions that, when executed, cause the processor to perform various functions described herein. The memory 625 may store image data, pixel array, configuration information (e.g., refresh pixel region information), among other information. In some cases, the memory 625 may contain, among other things, a BIOS which may control basic hardware or software operation such as the interaction with peripheral components or devices.

Software 630 may include code to implement aspects of the present disclosure, including code to support display refresh blocks determination for video coding. Software 630 may be stored in a non-transitory computer-readable medium such as system memory or other memory. In some cases, the software 630 may not be directly executable by the processor 620 but may cause a computer (e.g., when compiled and executed) to perform functions described herein.

Display 635 may represent a unit capable of displaying video, images, text or any other type of data for consumption by a viewer. Display 635 may include a liquid-crystal display (LCD), a LED display, an organic LED (OLED), an active-matrix OLED (AMOLED), or the like. In some cases, the display 635 and I/O component 645 may be or represent aspects of a same component (e.g., a touchscreen) of device 605. Display 635 may be configured to display multimedia content (e.g., images, video).

Transceiver 640 may communicate bi-directionally, via one or more antennas, wired, or wireless links as described above. For example, the transceiver 640 may represent a wireless transceiver and may communicate bi-directionally with another wireless transceiver. The transceiver 640 may also include a modem to modulate the packets and provide the modulated packets to the antennas for transmission, and to demodulate packets received from antennas. In some cases, the device 605 may include a single antenna. However, in some cases the device 605 may have more than one antenna, which may be capable of concurrently transmitting or receiving multiple wireless transmissions. For example, device 605 may communicate refresh pixel region information to server 125, or database 130, or another device.

The I/O component 645 may manage input and output signals for the device 605. The I/O component 645 may also manage peripherals not integrated into the device 605. In some cases, the I/O component 645 may represent a physical connection or port to an external peripheral. In some cases, the I/O component 645 may utilize an operating system such as iOS®, ANDROID®, MS-DOS®, MS-WINDOWS®, OS/2®, UNIX®, LINUX®, or another known operating system. In other cases, the I/O component 645 may represent or interact with a modem, a keyboard, a mouse, a touchscreen, or a similar device. In some cases, the I/O component 645 may be implemented as part of the processor 620. In some cases, a user may interact with the device 605 via the I/O component 645 or via hardware components controlled by the I/O component 645.

In some cases, I/O component 645 may be or include sensor(s) 650. Sensor(s) 650 may be an example of an image sensor for capturing photos and video. For example, sensor(s) 650 may represent a camera operable to capture an image of a scene that may be processed by multimedia manager 615 alone or in combination with processor 620 according to aspects of the present disclosure. In another example, sensor(s) 650 may be an optical depth sensor, a lux sensor, a motion sensor, an infrared heat sensor, among others. In some examples, the device 605 may include more than one sensor. Sensor(s) 650 may also be configured with multiple functionalities. For example, a single sensor 650 may be capable to perform operations related to the image sensor, the optical depth sensor, the motion sensor, or the light sensor, or any combination thereof. Sensor(s) 650 may be a CCD sensor or a CMOS sensor.

As detailed above, block diagram 600 and/or one or more components of the block diagram 600 may perform and/or be a means for performing, either alone or in combination with other elements, one or more operations for display refresh blocks determination for video coding.

Figure 7:
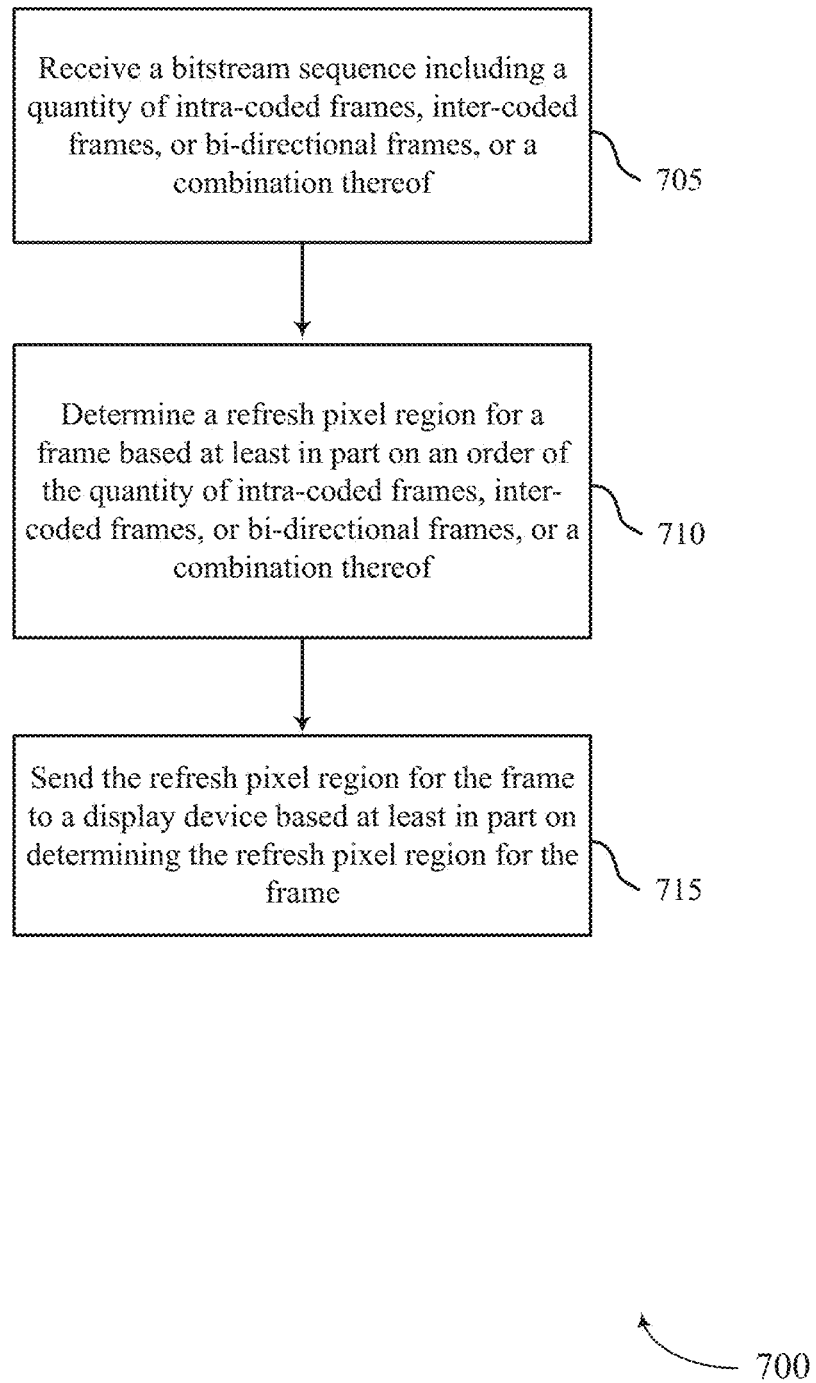
FIGS. 7 through 10 illustrate methods for display refresh blocks determination for video coding in accordance with aspects of the present disclosure.

FIG. 7 shows a flowchart illustrating a method 700 for display refresh blocks determination for video coding in accordance with aspects of the present disclosure. The operations of method 700 may be implemented by a device 115 or its components as described herein. For example, the operations of method 700 may be performed by a multimedia manager as described with reference to FIGS. 5 and 6. In some examples, a device 115 may execute a set of codes to control the functional elements of the device to perform the functions described below. Additionally, or alternatively, the device 115 may perform aspects of the functions described below using special-purpose hardware.

At 705, the device 115 may receive a bitstream sequence including a quantity of intra-coded frames, inter-coded frames, or bi-directional frames, or a combination thereof. The operations of 705 may be performed according to the methods described herein. In certain examples, aspects of the operations of 705 may be performed by a bitstream component 520 as described with reference to FIG. 5.

At 710, the device 115 may determine a refresh pixel region for a frame based at least in part on an order of the quantity of intra-coded frames, inter-coded frames, or bi-directional frames, or a combination thereof. The operations of 710 may be performed according to the methods described herein. In certain examples, aspects of the operations of 710 may be performed by a region component 525 as described with reference to FIG. 5.

At 715, the device 115 may send the refresh pixel region for the frame to a display device based at least in part on determining the refresh pixel region for the frame. The operations of 715 may be performed according to the methods described herein. In certain examples, aspects of the operations of 715 may be performed by a region component 525 as described with reference to FIG. 5.

Figure 8:
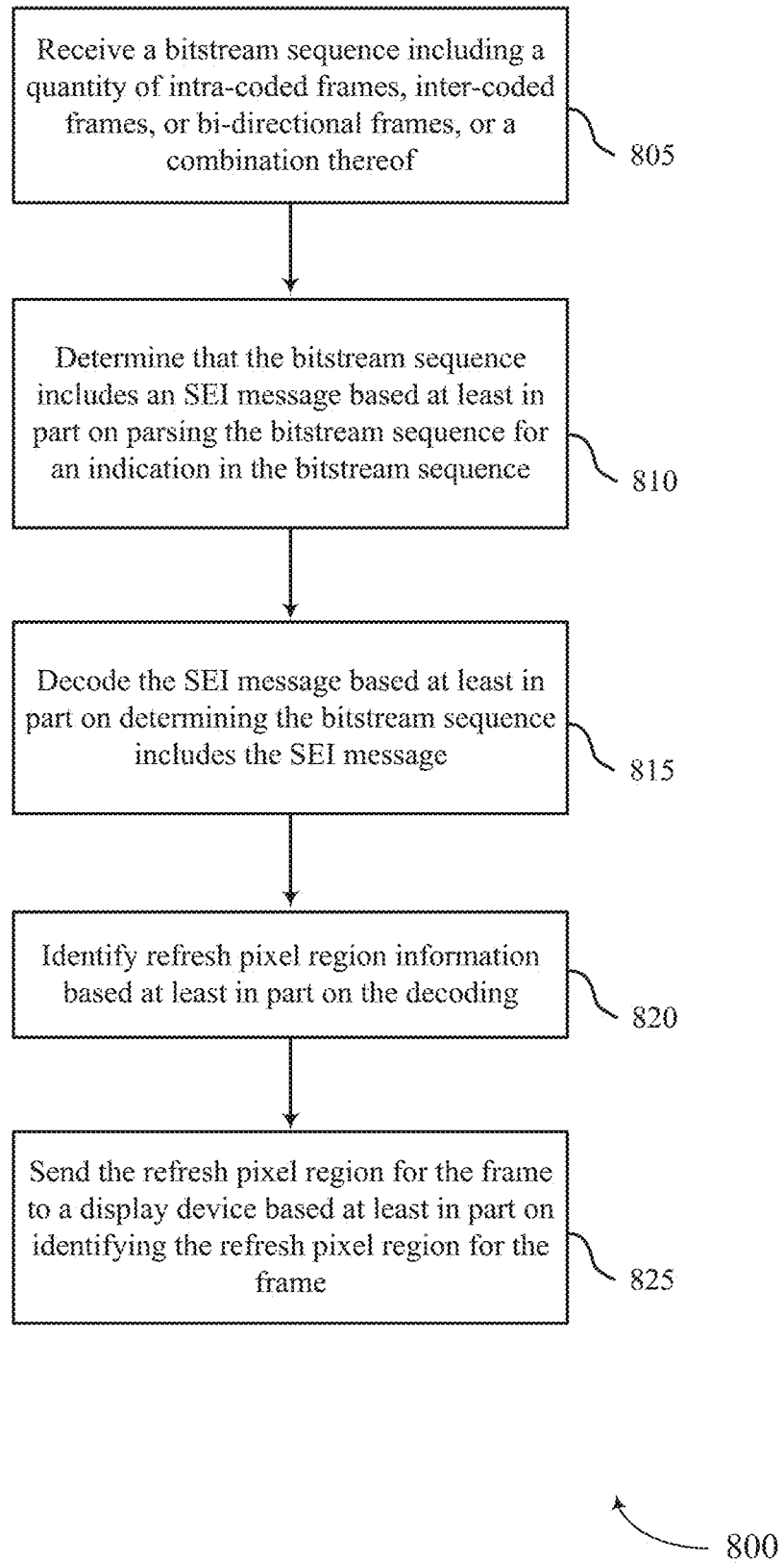

FIG. 8 shows a flowchart illustrating a method 800 for display refresh blocks determination for video coding in accordance with aspects of the present disclosure. The operations of method 800 may be implemented by a device 115 or its components as described herein. For example, the operations of method 800 may be performed by a multimedia manager as described with reference to FIGS. 5 and 6. In some examples, a device 115 may execute a set of codes to control the functional elements of the device to perform the functions described below. Additionally, or alternatively, the device 115 may perform aspects of the functions described below using special-purpose hardware.

At 805, the device 115 may receive a bitstream sequence including a quantity of intra-coded frames, inter-coded frames, or bi-directional frames, or a combination thereof. The operations of 805 may be performed according to the methods described herein. In certain examples, aspects of the operations of 805 may be performed by a bitstream component 520 as described with reference to FIG. 5.

At 810, the device 115 may determine that the bitstream sequence includes an SEI message based at least in part on parsing the bitstream sequence for an indication in the bitstream sequence. The operations of 810 may be performed according to the methods described herein. In certain examples, aspects of the operations of 810 may be performed by a bitstream component 520 as described with reference to FIG. 5.

At 815, the device 115 may decode the SEI message based at least in part on determining the bitstream sequence includes the SEI message. The operations of 815 may be performed according to the methods described herein. In certain examples, aspects of the operations of 815 may be performed by an encoding/decoding component 535 as described with reference to FIG. 5.

At 820, the device 115 may identify refresh pixel region information based at least in part on the decoding. The operations of 820 may be performed according to the methods described herein. In certain examples, aspects of the operations of 820 may be performed by a region component 525 as described with reference to FIG. 5.

At 825, the device 115 may send the refresh pixel region for the frame to a display device based at least in part on identifying the refresh pixel region for the frame. The operations of 825 may be performed according to the methods described herein. In certain examples, aspects of the operations of 825 may be performed by a region component 525 as described with reference to FIG. 5.

Figure 9:
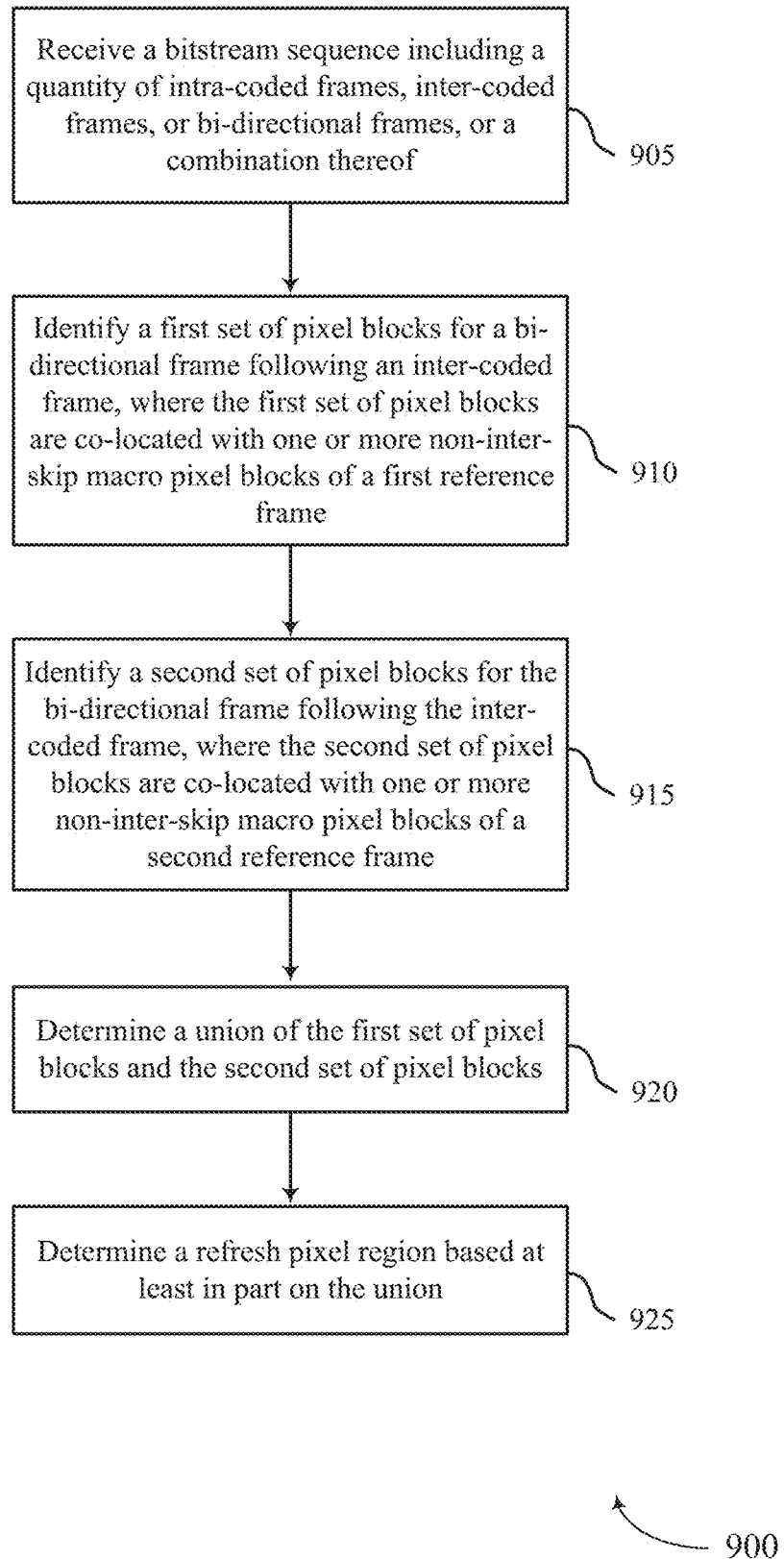

FIG. 9 shows a flowchart illustrating a method 900 for display refresh blocks determination for video coding in accordance with aspects of the present disclosure. The operations of method 900 may be implemented by a device 115 or its components as described herein. For example, the operations of method 900 may be performed by a multimedia manager as described with reference to FIGS. 5 and 6. In some examples, a device 115 may execute a set of codes to control the functional elements of the device to perform the functions described below. Additionally, or alternatively, the device 115 may perform aspects of the functions described below using special-purpose hardware.

At 905, the device 115 may receive a bitstream sequence including a quantity of intra-coded frames, inter-coded frames, or bi-directional frames, or a combination thereof. The operations of 905 may be performed according to the methods described herein. In certain examples, aspects of the operations of 905 may be performed by a bitstream component 520 as described with reference to FIG. 5.

At 910, the device 115 may identify a first set of pixel blocks for a bi-directional frame following a prior bi-directional frame, where the first set of pixel blocks are co-located with one or more non-inter-skip macro pixel blocks of a first reference frame. The operations of 910 may be performed according to the methods described herein. In certain examples, aspects of the operations of 910 may be performed by a pixel block component 530 as described with reference to FIG. 5.

At 915, the device 115 may identify a second set of pixel blocks for the bi-directional frame following the prior bi-directional frame, where the second set of pixel blocks are co-located with one or more non-inter-skip macro pixel blocks of a second reference frame. The operations of 915 may be performed according to the methods described herein. In certain examples, aspects of the operations of 915 may be performed by a pixel block component 530 as described with reference to FIG. 5.

At 920, the device 115 may determine a union of the first set of pixel blocks and the second set of pixel blocks. The operations of 920 may be performed according to the methods described herein. In certain examples, aspects of the operations of 920 may be performed by a pixel block component 530 as described with reference to FIG. 5.

At 925, the device 115 may determine a refresh pixel region for the frame based at least in part on the union. The operations of 925 may be performed according to the methods described herein. In certain examples, aspects of the operations of 925 may be performed by a region component 525 as described with reference to FIG. 5.

Figure 10:
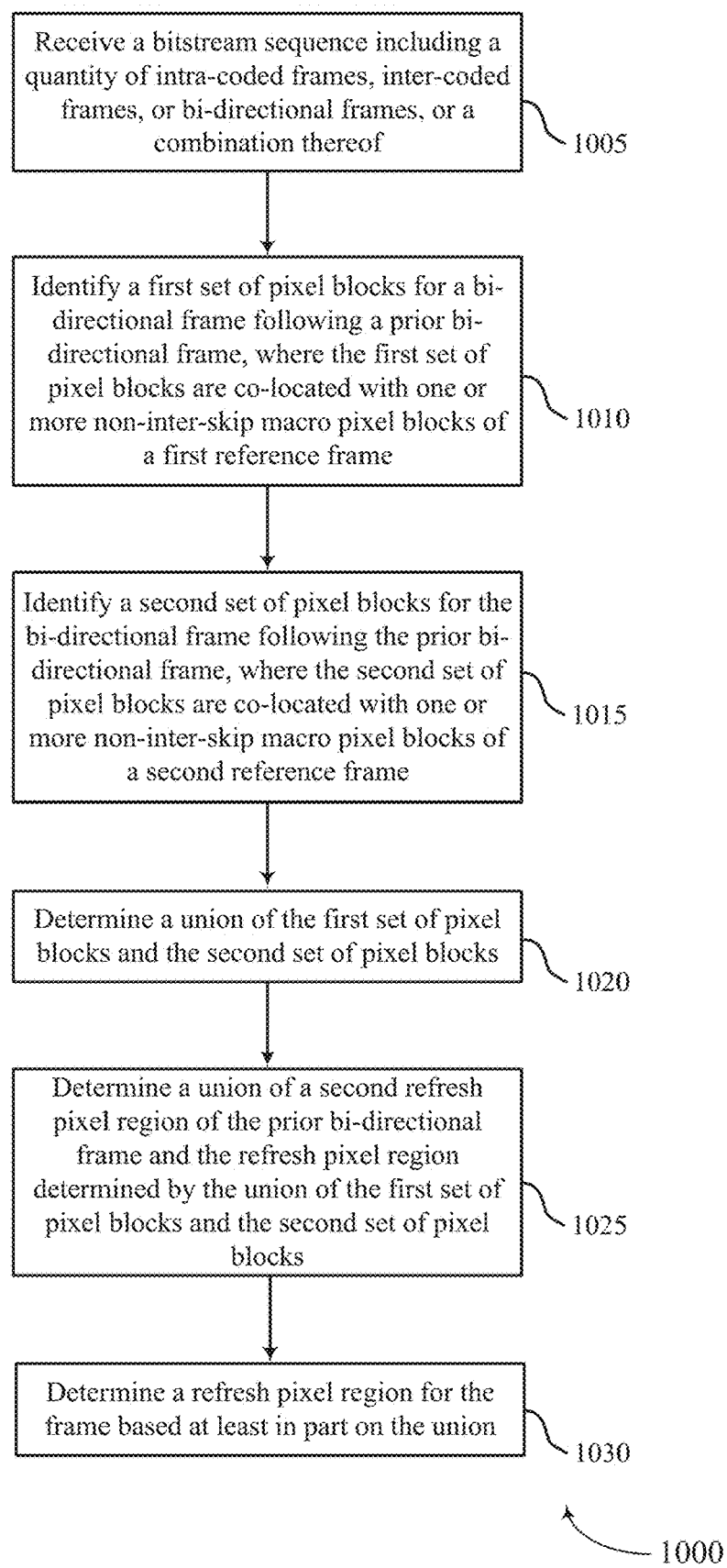

FIG. 10 shows a flowchart illustrating a method 1000 for display refresh blocks determination for video coding in accordance with aspects of the present disclosure. The operations of method 1000 may be implemented by a device 115 or its components as described herein. For example, the operations of method 1000 may be performed by a multimedia manager as described with reference to FIGS. 5 and 6. In some examples, a device 115 may execute a set of codes to control the functional elements of the device to perform the functions described below. Additionally, or alternatively, the device 115 may perform aspects of the functions described below using special-purpose hardware.

At 1005, the device 115 may receive a bitstream sequence including a quantity of intra-coded frames, inter-coded frames, or bi-directional frames, or a combination thereof. The operations of 1005 may be performed according to the methods described herein. In certain examples, aspects of the operations of 1005 may be performed by a bitstream component 520 as described with reference to FIG. 5.

At 1010, the device 115 may identify a first set of pixel blocks for a bi-directional frame following a prior bi-directional frame, where the first set of pixel blocks are co-located with one or more non-inter-skip macro pixel blocks of a first reference frame. The operations of 1010 may be performed according to the methods described herein. In certain examples, aspects of the operations of 1010 may be performed by a pixel block component 530 as described with reference to FIG. 5

At 1015, the device 115 may identify a second set of pixel blocks for the bi-directional frame following the prior bi-directional frame, where the second set of pixel blocks are co-located with one or more non-inter-skip macro pixel blocks of a second reference frame. The operations of 1015 may be performed according to the methods described herein. In certain examples, aspects of the operations of 1015 may be performed by a pixel block component 530 as described with reference to FIG. 5

At 1020, the device 115 may determine a union of the first set of pixel blocks and the second set of pixel blocks. The operations of 1020 may be performed according to the methods described herein. In certain examples, aspects of the operations of 1020 may be performed by a pixel block component 530 as described with reference to FIG. 5.

At 1025, the device 115 may determine a union of a second refresh pixel region of the prior bi-directional frame and the refresh pixel region determined by the union of the first set of pixel blocks and the second set of pixel blocks. The operations of 1025 may be performed according to the methods described herein. In certain examples, aspects of the operations of 1025 may be performed by a pixel block component 530 as described with reference to FIG. 5

At 1030, the device 115 may determine a refresh pixel region for the frame based at least in part on the union. The operations of 1030 may be performed according to the methods described herein. In certain examples, aspects of the operations of 1030 may be performed by a region component 525 as described with reference to FIG. 5.

It should be noted that the methods described above describe possible implementations, and that the operations and the steps may be rearranged or otherwise modified and that other implementations are possible. Further, aspects from two or more of the methods may be combined.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for processing display data, comprising:
   receiving a bitstream sequence comprising a quantity of intra-coded frames, inter-coded frames, or bi-directional frames, or a combination thereof;
   identifying a set of pixel blocks for an inter-coded frame following an intra-coded frame, wherein the set of pixel blocks are co-located with one or more non-inter-skip macro pixel blocks of a reference frame;
   determining a refresh pixel region for a frame based at least in part on one or more of the set of pixel blocks or an order of the quantity of intra-coded frames, inter-coded frames, or bi-directional frames, or a combination thereof; and
   sending the refresh pixel region for the frame to a display device based at least in part on determining the refresh pixel region for the frame.

2. The method of claim 1, further comprising:
   storing refresh pixel region information for the frame in a supplemental enhanced information (SEI) message based at least in part on determining the refresh pixel region for the frame.

3. The method of claim 1, further comprising:
   determining that the bitstream sequence comprises a supplemental enhanced information (SEI) message based at least in part on parsing the bitstream sequence for an indication in the bitstream sequence;
   decoding the SEI message based at least in part on determining the bitstream sequence comprises the SEI message; and
   identifying refresh pixel region information based at least in part on the decoding,
   wherein determining the refresh pixel region for the frame is based at least in part on identifying the refresh pixel region information in the SEI message.

4. The method of claim 1, wherein the refresh pixel region comprises:
   one or more pixel blocks indicating a change in content between the frame and a previous frame.

5. The method of claim 1, further comprising:
   determining an absence of a supplemental enhanced information (SEI) message in the bitstream sequence based at least in part on an indication in the bitstream sequence, wherein determining the refresh pixel region for the frame is based at least in part on determining the absence of the SEI message in the bitstream sequence.

6. The method of claim 5, further comprising:
   generating, in response to determining the absence of the SEI message in the bitstream sequence, metadata comprising refresh pixel region information, based at least in part on determining the refresh pixel region for the frame,
   wherein sending the refresh pixel region for the frame comprises sending the metadata.

7. The method of claim 1, further comprising:
   identifying a first set of pixel blocks for a bi-directional frame following an inter-coded frame, wherein the first set of pixel blocks are co-located with one or more non-inter-skip macro pixel blocks of a first reference frame;
   identifying a second set of pixel blocks for the bi-directional frame following the inter-coded frame, wherein the second set of pixel blocks are co-located with one or more non-inter-skip macro pixel blocks of a second reference frame; and
   determining a union of the first set of pixel blocks and the second set of pixel blocks,
   wherein determining the refresh pixel region is based at least in part on the union of the first set of pixel blocks and the second set of pixel blocks.

8. The method of claim 1, further comprising:
   identifying a first set of pixel blocks for a bi-directional frame following a prior bi-directional frame, wherein the first set of pixel blocks are co-located with one or more non-inter-skip macro pixel blocks of a first reference frame;

identifying a second set of pixel blocks for the bi-directional frame following the prior bi-directional frame, wherein the second set of pixel blocks are co-located with one or more non-inter-skip macro pixel blocks of a second reference frame; and determining a union of the first set of pixel blocks and the second set of pixel blocks, wherein determining the refresh pixel region is based at least in part on the union of the first set of pixel blocks and the second set of pixel blocks.

9. The method of claim 8, further comprising:

determining a union of a second refresh pixel region of the prior bi-directional frame and the refresh pixel region determined by the union of the first set of pixel blocks and the second set of pixel blocks, wherein the refresh pixel region comprises the union of the refresh pixel region of the prior bi-directional frame and the refresh pixel region determined by the union of the first set of pixel blocks and the second set of pixel blocks.

10. The method of claim 8, further comprising:

determining that the refresh pixel region of the bi-directional frame satisfies a threshold size of the bi-directional frame; and assigning a refresh pixel region size to all subsequent bi-directional frames based at least in part on the refresh pixel region of the bi-directional frame satisfying the threshold size, wherein the refresh pixel region size is a size of the subsequent bi-directional frames.

11. The method of claim 8, further comprising:

assigning for each intra-coded frame or inter-coded frame a refresh pixel region size equal to a frame size of each intra-coded frame or inter-coded frame.

12. The method of claim 1, further comprising:

identifying a set of pixel blocks for an inter-coded frame following a prior inter-coded frame, wherein the set of pixel blocks are co-located with one or more non-inter-skip macro pixel blocks of a reference frame; and determining a union of a second refresh pixel region of the prior inter-coded frame and the set of pixel blocks, wherein the set of pixel blocks comprises a refresh pixel region for the inter-coded frame, wherein determining the refresh pixel region is based at least in part on the union.

13. The method of claim 12, further comprising:

determining that the refresh pixel region of the inter-coded frame satisfies a threshold size of the inter-coded frame; and assigning a refresh pixel region size for all subsequent inter-coded frames based at least in part on the refresh pixel region of the inter-coded frame satisfying the threshold size, wherein the refresh pixel region size is a size of the subsequent inter-coded frames.

14. An apparatus for processing display data, comprising:

a processor, memory in electronic communication with the processor; and instructions stored in the memory and executable by the processor to cause the apparatus to:

receive a bitstream sequence comprising a quantity of intra-coded frames, inter-coded frames, or bi-directional frames, or a combination thereof;

identify a set of pixel blocks for an inter-coded frame following an intra-coded frame, wherein the set of pixel blocks are co-located with one or more non-inter-skip macro pixel blocks of a reference frame;

determine a refresh pixel region for a frame based at least in part on one or more of the set of pixel blocks or an order of the quantity of intra-coded frames, inter-coded frames, or bi-directional frames, or a combination thereof; and send the refresh pixel region for the frame to a display device based at least in part on determining the refresh pixel region for the frame.

15. The apparatus of claim 14, wherein the instructions are further executable by the processor to cause the apparatus to:

store refresh pixel region information for the frame in a supplemental enhanced information (SEI) message based at least in part on determining the refresh pixel region for the frame.

16. The apparatus of claim 14, wherein the instructions are further executable by the processor to cause the apparatus to:

determine that the bitstream sequence comprises a supplemental enhanced information (SEI) message based at least in part on parsing the bitstream sequence for an indication in the bitstream sequence;

decode the SEI message based at least in part on determining the bitstream sequence comprises the SEI message; and identify refresh pixel region information based at least in part on the decoding, wherein determining the refresh pixel region for the frame is based at least in part on identifying the refresh pixel region information in the SEI message.

17. The apparatus of claim 14, wherein the refresh pixel region comprises:

one or more pixel blocks indicating a change in content between the frame and a previous frame.

18. The apparatus of claim 14, wherein the instructions are further executable by the processor to cause the apparatus to:

determine an absence of a supplemental enhanced information (SEI) message in the bitstream sequence based at least in part on an indication in the bitstream sequence, wherein determining the refresh pixel region for the frame is based at least in part on determining the absence of the SEI message in the bitstream sequence.

19. An apparatus for processing display data, comprising:

means for receiving a bitstream sequence comprising a quantity of intra-coded frames, inter-coded frames, or bi-directional frames, or a combination thereof;

means for identifying a set of pixel blocks for an inter-coded frame following an intra-coded frame, wherein the set of pixel blocks are co-located with one or more non-inter-skip macro pixel blocks of a reference frame;

means for determining a refresh pixel region for a frame based at least in part on one or more of the set of pixel blocks or an order of the quantity of intra-coded frames, inter-coded frames, or bi-directional frames, or a combination thereof; and means for sending the refresh pixel region for the frame to a display device based at least in part on determining the refresh pixel region for the frame.

20. The apparatus of claim 18, wherein the instructions are further executable by the processor to cause the apparatus to:

generate, in response to determining the absence of the SEI message in the bitstream sequence, metadata comprising refresh pixel region information, based at least in part on determining the refresh pixel region for the frame,
wherein the instructions to send the refresh pixel region for the frame are further executable by the processor to cause the apparatus to send the metadata.

* * * * *